US011877372B2

(12) United States Patent
Jung et al.

(10) Patent No.: US 11,877,372 B2
(45) Date of Patent: Jan. 16, 2024

(54) HALF-FLEX TYPE INDUCTION HEATING DEVICE ENABLING IMPROVED USER EXPERIENCE AND USER INTERFACE

(71) Applicant: LG Electronics Inc., Seoul (KR)

(72) Inventors: Mijin Jung, Seoul (KR); Soyeon Ko, Seoul (KR); Hyeonna Han, Seoul (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 17/046,951

(22) PCT Filed: Apr. 12, 2019

(86) PCT No.: PCT/KR2019/004402
§ 371 (c)(1),
(2) Date: Oct. 12, 2020

(87) PCT Pub. No.: WO2019/199097
PCT Pub. Date: Oct. 17, 2019

(65) Prior Publication Data

US 2021/0153308 A1 May 20, 2021

(30) Foreign Application Priority Data

Apr. 12, 2018 (KR) ........................ 10-2018-0042724
Apr. 16, 2018 (KR) ........................ 10-2018-0044072
Apr. 16, 2018 (KR) ........................ 10-2018-0044073

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01)

(58) Field of Classification Search
CPC ...... H05B 6/062; H05B 6/065; H05B 6/1272; H05B 2213/03; H05B 2213/04;
(Continued)

(56) References Cited

U.S. PATENT DOCUMENTS

2006/0289489 A1* 12/2006 Wang ..................... H05B 6/062 219/622
2012/0248098 A1* 10/2012 Lee ..................... H05B 6/1272 219/660
(Continued)

FOREIGN PATENT DOCUMENTS

EP 2258987 12/2010
JP 2010232151 10/2010
(Continued)

OTHER PUBLICATIONS

Partial European Search Report in European Appln. No. 19785029.0, dated Dec. 3, 2021, 17 pages.
(Continued)

*Primary Examiner* — Quang T Van
(74) *Attorney, Agent, or Firm* — Fish & Richardson P.C.

(57) ABSTRACT

A half-flex type induction heating device enabling an improved user experience and user interface includes: a first controller for switching a heating intensity image and a modified timer image displayed on an input interface into a power image and a residual heat image when a touch input is applied, the touch input meaning the termination of, among a plurality of working coils, a working coil being driven, and a second controller for stopping the driving of the working coil being driven. The half-flex type induction heating device may enable the one-step termination of a burner.

12 Claims, 23 Drawing Sheets

(58) Field of Classification Search
CPC .............. H05B 2213/07; H05B 6/1218; A61B 17/07207; A61B 17/295; A61B 2017/00017; A61B 2017/00022; A61B 2017/00154; A61B 2017/0019; A61B 2017/00398; A61B 2017/2927; A61B 2034/2051; A61B 2034/2059; A61B 2090/067; A61B 34/20; A61K 2039/505; A61K 2800/624; A61K 2800/654; A61K 39/395; A61K 49/00; A61K 8/11; A61K 8/91; A61P 25/14; A61P 25/16; A61P 25/28; A61P 9/00; A61Q 5/02; A61Q 5/12; B01J 13/14; B01J 13/16; B01J 13/206; C07K 16/18; C07K 2317/24; C07K 2317/30; C07K 2317/33; C07K 2317/34; C07K 2317/565; C07K 2317/76; C07K 2317/92; C07K 2317/94; C08G 18/603; C11D 11/0017; C11D 17/0039; C11D 3/3719; C11D 3/3788; C11D 3/505; F25D 2400/28; G01N 2333/4709; G01N 2800/2821; G01N 33/6896
USPC ....... 219/620, 621, 622, 624, 626, 627, 632, 219/385, 447.1
See application file for complete search history.

(56) References Cited

U.S. PATENT DOCUMENTS

| | | | | |
|---|---|---|---|---|
| 2012/0285946 | A1* | 11/2012 | Brosnan ................. | H05B 6/062 219/624 |
| 2017/0285926 | A1* | 10/2017 | Brasseur ............... | G06F 3/0488 |

FOREIGN PATENT DOCUMENTS

| | | |
|---|---|---|
| JP | 2013062173 | 4/2013 |
| JP | 2014044852 | 3/2014 |
| JP | WO2014199597 | 2/2017 |
| JP | 6268613 | 1/2018 |
| KR | 20060081740 | 7/2006 |
| KR | 20060081741 | 7/2006 |
| WO | WO2016010490 | 1/2016 |

OTHER PUBLICATIONS

Office Action in Korean Appln. No. 10-2018-0042724, dated Jun. 15, 2022, 15 pages (with English translation).

* cited by examiner

HALF-FLEX TYPE INDUCTION HEATING DEVICE ENABLING IMPROVED USER EXPERIENCE AND USER INTERFACE

CROSS-REFERENCE TO RELATED APPLICATIONS

This application is a National Stage application under 35 U.S.C. § 371 of International Application No. PCT/KR2019/004402, filed on Apr. 12, 2019, which claims the benefit of Korean Patent Application No. 10-2018-0042724, filed on Apr. 12, 2018, Korean Patent Application No. 10-2018-0044073, filed on Apr. 16, 2018, and Korean Patent Application No. 10-2018-0044072, filed on Apr. 16, 2018. The disclosures of the prior applications are incorporated by reference in their entirety.

TECHNICAL FIELD

The present disclosure relates to a half-flex type induction heating device capable of ensuring improvement in user experience and user interface.

BACKGROUND ART

Various types of cooking apparatuses are used to heat food at homes or restaurants. Gas stoves can use gas as fuel. In some cases, cooking apparatuses can use electricity for heating an object to be heated such as a cooking vessel including a pot.

Methods for heating an object to be heated using electricity can be classified as a resistance heating method and an induction heating method. In the resistance heating method, an object can be heated by heat that is generated when electric current flows through a metallic resistance wire or a non-metallic heating element such as silicon carbide, and the heat is delivered to the object to be heated (e.g., a cooking vessel) through radiation or conduction. In the induction heating method, an object to be heated itself can be heated by eddy currents that are generated in the object to be heated made of metallic ingredients based on a magnetic field generated around a coil when a predetermined magnitude of high-frequency power is supplied to the coil.

An induction heating device, to which the induction heating method is applied, can include a working coil in each corresponding zone to heat a plurality of objects to be heated (e.g., cooking vessels).

In recent years, an induction heating device capable of heating a single object using a plurality of working coils at the same time has been used. For example, a half-flex type induction heating device can include a plurality of working coils that are disposed in each of the plurality of zones spaced apart from each other. In this case, the induction heating device can inductively heat an object to be heated based on a size of the object to be heated by operating some of the plurality of working coils in a specific zone with the plurality of working coils.

The half-flex type induction heating device can be provided with an input interface. The input interface can be a module for inputting a heating intensity or a driving period and the like desired by a user and can be implemented in numerous forms such as a physical button or a touch panel and the like. The input interface can also be provided with a display panel (i.e., a touch screen panel) on which a driving state of the induction heating device is displayed.

In a half-flex type induction heating device of the related art, when a burner (i.e., a working coil being driven) is stopped, a user has to enter into (i.e., access) a setting window for a heating intensity of a burner through an input interface and then to adjust the heating intensity to 0. That is, the user can stop the burner after the two steps. Accordingly, in an emergency (e.g., a situation where water in a pot boils over), the user cannot immediately deal with the situation.

In the half-flex type induction heating device of the related art, when heating intensities of all the burners being driven are lowered, the user has to select each of the burners through the input interface and to change the heating intensities respectively or to turn off the induction heating device itself. It takes a while for the user to change the heating intensity of each of the burners. When the induction heating device itself is turned off, the user has to reset previous input values to restart cooking.

In case a heated vessel or a cutting board applying an external force is placed on the input interface while the induction heating device is being used, the input interface is highly likely to be damaged by the heated vessel or the cutting board and the like.

The induction heating device of the related art can display a pop-up message (or a pop-up image), which says "Do not cover the screen", on the input interface when a touch area of the input interface is larger than a reference area.

In the above method of displaying a pop-up based on a touch area, no pop-up appears when a heated vessel having an area smaller than the reference area is placed on the input interface. Accordingly, the input interface is highly likely to be damaged by the heat.

When the user cuts food ingredients applying an external force to the input interface in a state where a partial area (i.e., the reference area or smaller) of the cutting board is on the input interface, no pop-up appears on the input interface. Accordingly, the input interface is highly likely to be damaged by the vibration (i.e., an impact).

The input interface of the half-flex type induction heating device of the related art cannot display residual heat. Accordingly, the user does not know whether an upper plate (an upper plate of a cover plate on which an object to be heated is placed) of the induction heating device remains hot.

Thus, an accident such as burns is highly likely to happen to the user due to the residual heat on the induction heating device, and the user cannot use the induction heating device for cooking efficiently due to the risk of a burn caused by the residual heat.

The input interface of the half-flex type induction heating device of the related art displays a burner at a position where an object to be heated is placed when a working coil operates. Information on a set heating intensity and timer (i.e., a heating period) can only be displayed in the burner. Accordingly, the user cannot visually notice that the object to be heated is being heated through the burner.

SUMMARY

Technical Problems

The present disclosure is directed to a half-flex type induction heating device that may enable a one-step termination of a burner.

The present disclosure is also directed to a half-flex type induction heating device that may simultaneously temporarily lower or restore heating intensities of a plurality of burners being driven. The present disclosure is also directed to a half-flex type induction heating device that may ensure improvement in user experience (UX) and user interface (UI).

The present disclosure is also directed to a half-flex type induction heating device that may sense heat or external force and provide an alarm for protection of an input interface.

The present disclosure is also directed to a half-flex type induction heating device that may sense and display residual heat.

The present disclosure is also directed to a half-flex type induction heating device that may visually display a heating image.

The present disclosure is also directed to a half-flex type induction heating device that may display a power image at a corresponding position of an input interface when sensing an object to be heated on an upper surface of a cover plate.

Aspects of the present disclosure are not limited to the above-described ones. Additionally, other aspects and advantages that have not been mentioned may be clearly understood from the following description and may be more clearly understood from embodiments. Further, it will be understood that the aspects and advantages of the present disclosure may be realized via means and combinations thereof that are described in the appended claims.

Technical Solutions

A half-flex type induction heating device according to the present disclosure may include a first control module configured to change a heating intensity image and a timer image, displayed on an input interface, into a power image and a residual heat image, and a second control module configured to stop driving of a working coil being driven, when a touch input indicates a termination of the working coil being driven among a plurality of working coils, thereby enabling a one-step termination of a burner.

Additionally, a half-flex type induction heating device according to the present disclosure may include a second control module configured to change heating intensities of all the working coils being driven among a plurality of working coils into a predetermined heating intensity when a touch input of a temporarily lowering icon, displayed on a lower end of an input interface, is provided from a user to the input interface, thereby making it possible to simultaneously temporarily lower or restore heating intensities of a plurality of burners being driven.

Additionally, a half-flex type induction heating device according to the present disclosure may include an input interface embedded in an upper surface of a cover plate and configured to receive a touch input from a user and display a specific image, a first control module configured to receive a touch input from the input interface and to control a specific image displayed on the input interface based on the touch input received from the input interface, and a second control module configured to receive a touch input from the first control module and to control driving of a plurality of working coils based on the touch input received from the first control module, thereby making it possible to ensure improvement in user experience and user interface.

Additionally, a half-flex type induction heating device according to the present disclosure may include an input interface embedded in an upper surface of a cover plate and configured to display a specific image, a sensor configured to sense at least one of temperature and vibration of the input interface, and a first control module configured to receive information on at least one of temperature and vibration of the input interface from the sensor and to control whether to display a protection guide image based on the received information on at least one of temperature and vibration of the input interface, thereby making it possible to provide an alarm for protection of the input interface.

Additionally, a half-flex type induction heating device according to the present disclosure may include a temperature sensor configured to sense a temperature of a cover plate, an input interface embedded in an upper surface of the cover plate and configured to display a specific image, a first control module configured to receive information on the temperature of the cover plate from the temperature sensor and to control whether to display a residual heat image of the input interface based on the received information on the temperature of the cover plate, and a second control module configured to detect a working coil where an object to be heated is placed at an upper portion thereof among a plurality of working coils, thereby making it possible to sense and display residual heat.

Further, a half-flex type induction heating device according to the present disclosure may include an input interface embedded in an upper surface of a cover plate and configured to receive a touch input from a user and display a specific image, and a first control module configured to receive a touch input from the input interface, and, when the received touch input is a touch input in relation to a specific heating intensity, to control the input interface such that the input interface displays a heating image, thereby making it possible to visually display a heating image.

Furthermore, a half-flex type induction heating device according to the present disclosure may include an input interface embedded in parallel with an upper surface of a cover plate and configured to display a specific image, a first control module configured to control a specific image, displayed on the input interface, based on a touch input received from the input interface, and a second control module configured to detect a working coil where an object to be heated is placed at an upper portion thereof among a plurality of working coils, the first control module configured to control the input interface such that the input interface displays an object-to-be-heated burner image and a power image based on information on the position of the object to be heated, thereby making it possible to ensure improvement in user experience and user interface.

Advantageous Effects

A half-flex type induction heating device according to the present disclosure may enable a one-step termination of a burner. Accordingly, in an emergency (e.g., a situation where water in a pot boils over), a user may immediately deal with the situation. Thus, the risk of a fire or a burn may be reduced.

The half-flex type induction heating device may simultaneously temporarily lower or restore heating intensities of a plurality of burners being driven. Accordingly, improvement in user convenience may be ensured. Additionally, in an emergency (e.g., a situation where water in a pot boils over), the user may deal with the situation efficiently.

The half-flex type induction heating device may ensure improvement in user experience and user interface. Accordingly, user convenience in different situations may be improved.

The half-flex type induction heating device may protect an input interface. Accordingly, the risk of damage, caused by heat or vibration (i.e., an impact), to the input interface may be reduced. Thus, the lifespan of the input interface may be improved.

The half-flex type induction heating device may sense and display residual heat. Accordingly, the user may be prevented from burns caused due to the residual heat and may avoid worries about the residual heat. Thus, efficiency of cooking may be ensured.

The half-flex type induction heating device may visually display a heating image. Accordingly, the user may easily visually notice that an object to be heated is being heated and have no need to repeatedly check whether the object to be heated is rightly being heated. Thus, ease of use may be improved.

When sensing an object to be heated on an upper surface of a cover plate, the half-flex type induction heating device may allow a power image to be displayed at a corresponding position of the input interface. Accordingly, the user may operate a working coil intuitively. Thus, user experience and user interface may be improved, and user convenience may be ensured in different situations.

Detailed effects are described along with the above-described effects in the detailed description of the disclosure.

BEST MODE

Figure 1:
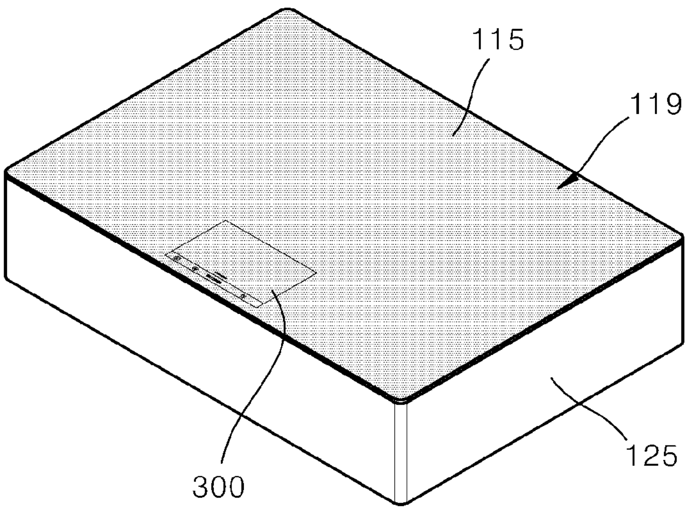
FIG. 1 is a perspective view showing a half-flex type induction heating device according to some embodiments.

Below, embodiments are described with reference to the accompanying drawings. Throughout the drawings, identical reference numerals denote identical or similar components.

Below, a half-flex type induction heating device according to some embodiments is described.

Figure 2:
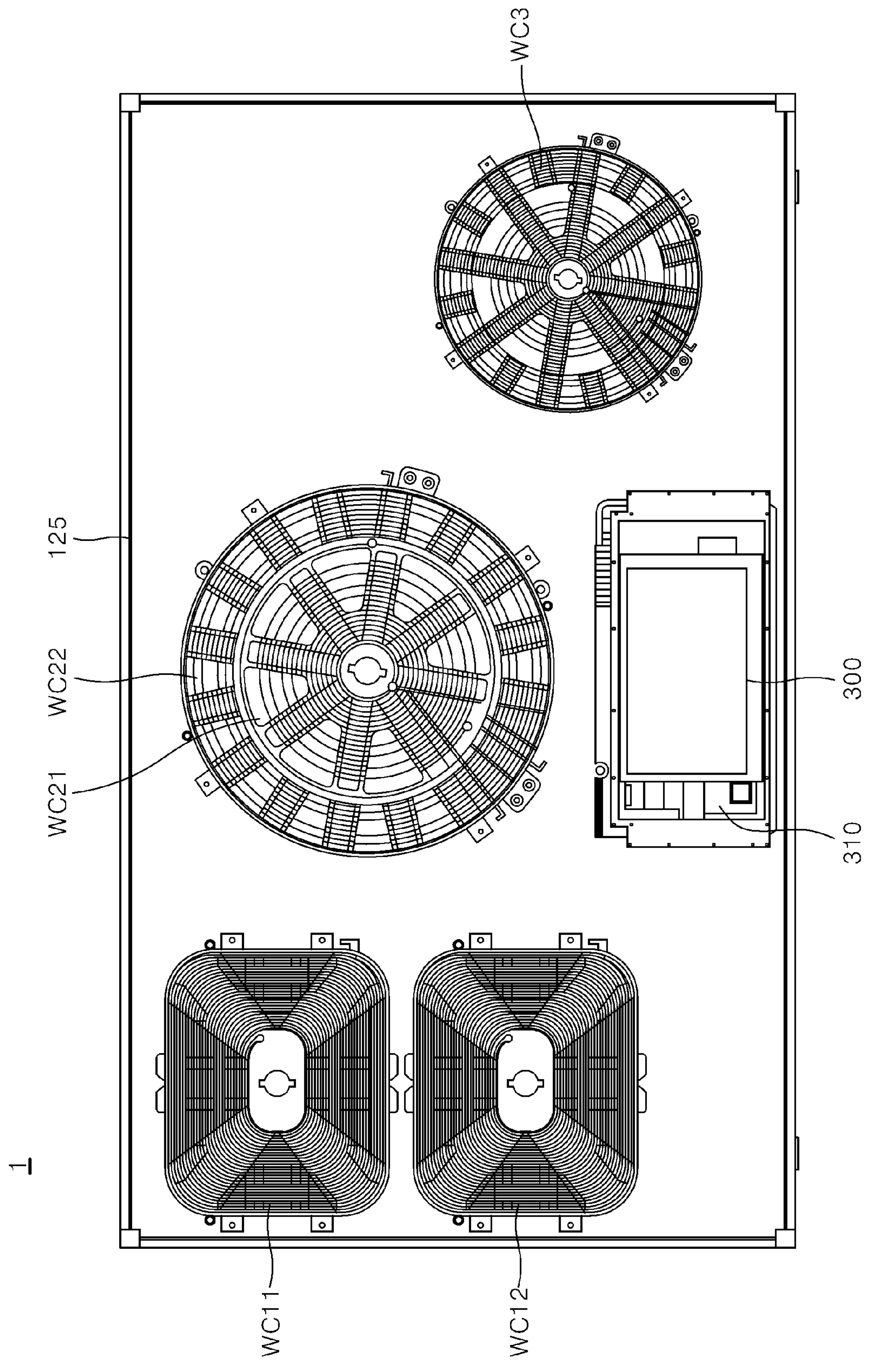
FIG. 2 is a plan view for describing an example half-flex type induction heating device.
Figure 3:
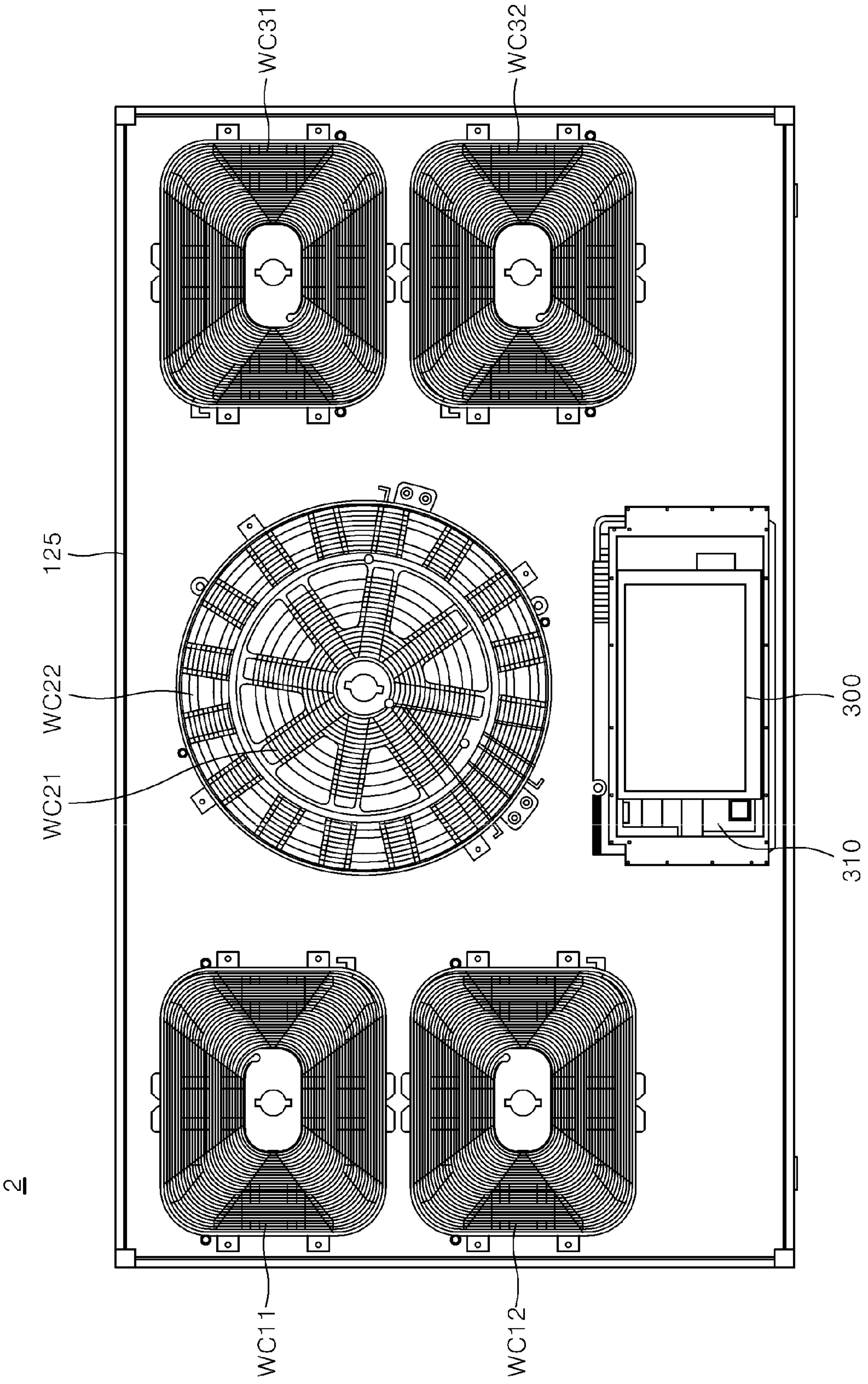
FIG. 3 is a plan view for describing another example half-flex type induction heating device.
Figure 4:
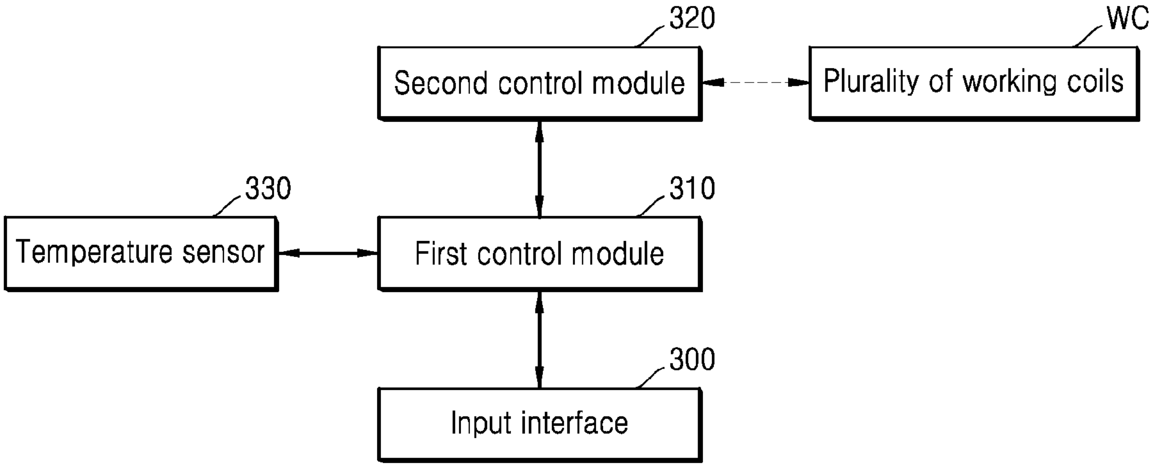
FIG. 4 is a schematic view for describing an example of a control flow of the half-flex type induction heating device in FIG. 1.

FIG. 1 is a perspective view showing a half-flex type induction heating device according to some embodiments. FIG. 2 is a plan view for describing an example half-flex type induction heating device. FIG. 3 is a plan view for describing another example half-flex type induction heating device. FIG. 4 is a schematic view for describing a control flow of the half-flex type induction heating device in FIG. 1.

FIGS. 2 and 3 show a half-flex type induction heating device without the cover plate 119 in FIG. 1, for convenience of description.

Referring to FIGS. 1 to 4, a half-flex type induction heating device according to some embodiments may include a case 125, a cover plate 119, an input interface 300, a first control module 310, a second control module 320, a temperature sensor 330, a plurality of working coils (WC) and the like.

Though not illustrated in the drawings, the case 125 may include various types of parts constituting the half-flex type induction heating device, such as a base plate where a working coil is installed in addition to the plurality of working coils (WC), an indicator substrate supporter where an indicator substrate is installed, a plurality of light emitting elements disposed on the indicator substrate, an indicator substrate configured to control driving of the plurality of light emitting elements, a light guide configured to display light, emitted from the light emitting element, through a light emitting surface, and a blowing fan configured to cool heat generated by the working coil or the plurality of the light emitting elements, for example.

Additionally, the case 125 may be provided with various devices in relation to driving of the working coil (WC). For example, the case 125 may be provided with a power supplier that supplies AC power, a rectifier that rectifies AC power of the power supplier into DC power, an inverter that converts DC power rectified by the rectifier into resonance currents through switching operations and that supplies the resonance currents to the working coil (WC), a second control module 320 that controls the inverter and parts in relation to driving of the inverter, a relay or a semiconductor switch that turns on or off the working coil (WC), and the like. However, detailed description in relation to this is omitted.

Further, the case 125 may be thermally insulated to prevent heat, generated by the working coil (WC), from leaking outwards.

The cover plate 119 may be coupled to an upper end of the case 125 and shield an inside of the case 125. An object to be heated (not illustrated; i.e., an object to be heated by at least one of the plurality of working coils (WC)) may be placed on an upper surface of the cover plate 119.

The cover plate 119 may include an upper plate 115 on which an object to be heated such as a cooking vessel is placed, and heat generated by the working coil (e.g., WC) may be delivered to the object to be heated through the upper plate 115.

The upper plate 115 may be made of glass, for example, and the input interface 300, which receives an input from a user and delivers the input to the first control module 310, may be installed on the upper plate 115.

The input interface 300 may be installed on the upper surface of the cover plate 119—embedded in parallel with the upper plate 115—(that is, an upper surface of the input interface 300 may be disposed on the same flat surface as the upper plate 115), and may show a specific image. The input interface 300 may receive a touch input from the user and provide the received touch input to the first control module 310.

Specifically, the input interface 300 may be a module for inputting heating intensity or a heating period and the like desired by the user, and may be implemented in various forms such as a physical button or a touch panel and the like. Further, the input interface 300 may be provided with a display panel (i.e., a touch screen panel) that shows a state of driving of the half-flex type induction heating device.

The input interface 300 may deliver an input, received from the user, to the first control module 310, and the first control module 310 may deliver the input to the second control module 320. Description in relation to this is provided hereunder.

The temperature sensor 330 may sense a temperature of the cover plate 119.

The temperature sensor 330 may sense a temperature of the cover plate 119 and provide information on the sensed temperature of the cover plate 119 to the first control module 310.

The first control module 310 may receive the information on the temperature of the cover plate 119 from the temperature sensor 330, and, based on the received information, may control whether to show residual heat of the input interface 300.

Specifically, the first control module 310 may control driving of the input interface 300. That is, the input interface 300 may show (i.e., display) a specific image according to a control instruction of the first control module 310.

The first control module 310 may receive a user's touch input from the input interface 300, and may deliver the received touch input to the second control module 320 or may control or select a specific image displayed on the input interface 300 based on the received touch input.

Additionally, the first control module 310 may receive information on a position of an object to be heated from the second control module 320, and may control or select a specific image displayed on the input interface 300 based on the received information.

The second control module 320 may control driving of the plurality of working coils (WC) and detect a working coil, where an object to be heated is placed at an upper portion thereof among the plurality of working coils (WC).

The second control module 320, as described above, may control an inverter and parts in relation to driving of the inverter to control the driving of the plurality of working coils (WC). Additionally, the second control module 320 may provide information on a position of a detected object to be heated to the first control module 310 and receive a user's touch input from the first control module 310.

The second control module 320 may control the driving of the plurality of working coils (WC) based on the user's touch input received from the first control module 310.

The plurality of working coils (WC) may be installed in the case 125, and the driving of the plurality of working coils (WC) may be controlled by the second control module 320. The plurality of working coils (WC) may be disposed as illustrated in FIG. 2 or 3.

An example half-flex type induction heating device 1, as illustrated in FIG. 2, may include first and second working coils (WC11 and WC12) disposed on a half free zone (HFZ), third and fourth working coils (WC21 and WC22) disposed on a dual burner zone (DZ), and a fifth working coil (WC3) disposed on a selected burner zone (SZ).

The half free zone (HFZ), the dual burner zone (DZ) and the selected burner zone (SZ) may be spaced apart from each other.

Another example half-flex type induction heating device 2, as illustrated in FIG. 3, may include first and second working coils (WC11 and WC12) disposed on a first half free zone (HFZ1), third and fourth working coils (WC21 and WC22) disposed on a dual burner zone (DZ), and fifth and sixth working coils (WC31 and WC32) disposed on a second half free zone (HFZ2).

The first half free zone (HFZ1), the dual burner zone (DZ) and the second half free zone (HFZ1) may be spaced apart from each other.

Each of the zones in FIGS. 2 and 3 may be disposed in various different ways.

The driving of each of the working coils (WC) may be controlled by the second control module 320. For convenience of description, a single working coil (WC) is provided as an example to describe how the working coils are driven.

The working coil (WC) may include conductive wire wound multiple times in a ring shape and may generate an AC magnetic field. Additionally, a mica sheet and a ferrite core may be consecutively disposed at a lower side of the working coil (WC).

The ferrite core may be fixed to the mica sheet through a sealant, and may spread the AC magnetic field generated by the working coil (WC).

The mica sheet may be fixed to the working coil (WC) and the ferrite core through the sealant, and may prevent heat, generated by the working coil (WC), from being directly delivered to the ferrite core.

The example half-flex type induction heating device may perform the function of wireless power transmission based on the above configurations and features.

In recent years, technologies for wirelessly supplying power have been developed and have been used for a wide range of electronic devices. A battery of an electronic device, to which the wireless power transmitting technology is applied, can be charged only by being placed on a charge pad without connecting to an additional charge connector. Accordingly, the electronic device, to which the wireless power transmitting technology is applied, requires no cord or no charger, thereby ensuring improved mobility and a reduced size and weight.

The wireless power transmitting technology can be broadly classified as an electromagnetic induction technology using a coil, a resonance technology using resonance, and a radio emission technology for converting electric energy into microwaves and delivering the microwaves, and the like. In the electromagnetic induction technology, power is transmitted using electromagnetic induction between a primary coil (e.g., a working coil) included in an apparatus for wirelessly transmitting power and a secondary coil included in an apparatus for wirelessly receiving power.

The theory of the induction heating technology of the half-flex type induction heating device is substantially the same as that of the wireless power transmitting technology using electromagnetic induction, in that an object to be heated is heated through electromagnetic induction.

Accordingly, the half-flex type induction heating device 1, 2 according to some embodiments may perform the function of wireless power transmission as well as the function of induction heating. Additionally, an induction heating mode or a wireless power transmitting mode may be controlled by the first control module 310. Thus, when necessary, the function of induction heating or the function of wireless power transmission may be optionally performed.

The half-flex type induction heating devices 1, 2 according to some embodiments have the above configurations and features. Below, a method of controlling the half-flex type induction heating devices 1, 2 is described.

Figure 5:
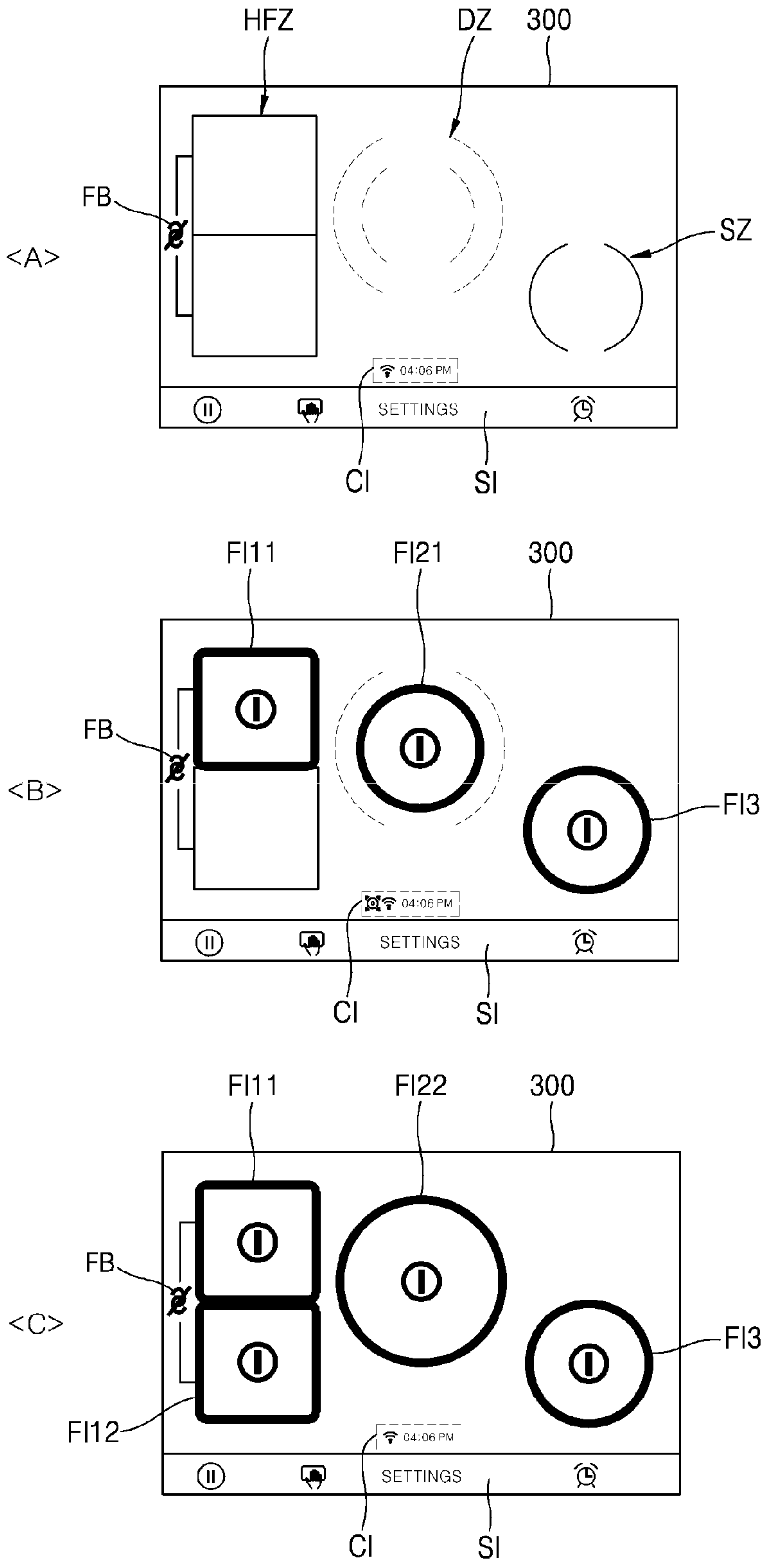
FIGS. 5 and 6 are schematic views for describing a method of displaying an automatic sensing mode in a half-flex type induction heating device according to some embodiments.
Figure 6:
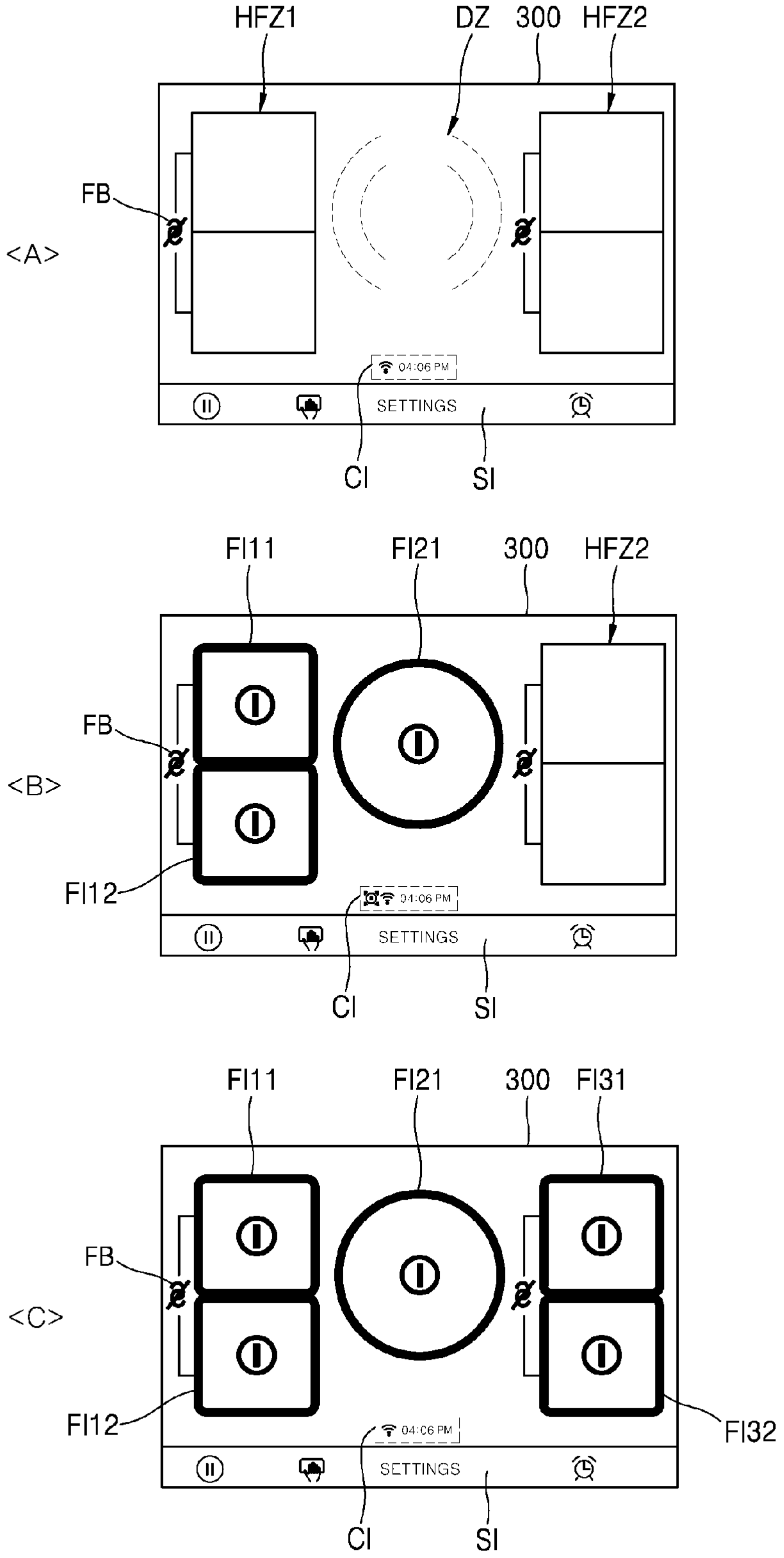

FIGS. 5 and 6 are schematic views for describing a method of displaying an automatic sensing mode in a half-flex type induction heating device according to some embodiments.

FIG. 5 shows an interface 300 of an example half-flex type induction heating device 1 in FIG. 2, and FIG. 6 shows an interface 300 of another example half-flex type induction heating device 2 in FIG. 3.

When an object to be heated is placed on the upper plate 115 of the cover plate 119, the second control module 320 may detect a working coil where the object to be heated is placed at an upper portion thereof among the plurality of working coils (WC).

Herein, the second control module 320 may detect a degree to which resonance current flowing through each of the working coils is attenuated, and based on a result of the detection, may detect the working coil where the object to be heated is placed on the upper portion thereof.

Specifically, when an object to be heated is placed on a working coil (e.g., WC), entire resistance may be increased due to resistance of the object to be heated. Accordingly, a degree, to which resonance current flowing through the working coil (e.g., WC) is attenuated, may increase.

The second control module 320, as described above, may detect resonance current flowing through the working coil (e.g., WC), and based on a value of the detection, may detect whether the object to be heated is placed on the working coil (e.g., WC).

The second control module 320 may detect an object to be heated according to another method. However, in the embodiment, the method described above is provided as an example of a method of detecting an object to be heated.

When a position of the object to be heated is detected according to the method, the second control module 320 may provide information on the detected position of the object to be heated to the first control module 310.

Additionally, the first control module 310 may control the input interface 300 based on the information on the position of the object to be heated, received from the second control module 320, such that the input interface 300 displays an object-to-be-heated burner image (FI).

The input interface 300 may display first to third zone (e.g., HFZ, DZ and SZ in FIG. 5) images corresponding to positions of the plurality of working coils (WC), object-to-be-heated burner images (e.g., FI11, F12, F21, F22 and F3), a setting image (SI) in which setting icons (e.g., a temporarily lowering icon, a button locking icon, a setting list icon and a timer icon) are displayed, and an auxiliary image (CI) in which auxiliary icons (e.g., an object-to-be-heated automatic sensing state icon, a Wi-Fi connection state icon and a current time displaying icon) are displayed.

For convenience of description, the first to third zone (HFZ, DZ and SZ) images in FIG. 5 are described hereunder as an example.

The first to third zone (HFZ, DZ and SZ) images may be further blurred than object-to-be-heated burner images (e.g., FI11, FI12, FI21, FI22 and FI3) corresponding thereto. The first to third zone (HFZ, DZ and SZ) images may be disposed to correspond to positions of the plurality of working coils (WC) in FIG. 2.

The first zone (HFZ) image may indicate a half free burner zone, and may include two burner zones disposed in an up-down direction. Each of the burner zones may correspond to the first and second working coils (WC1 and WC2) in FIG. 2.

For example, when the first and second working coils (WC1 and WC2) detect an object to be heated at the same time, object-to-be-heated burner images (FI11 and FI12) may be respectively simultaneously activated on the two burner zones (<C> in FIG. 5). The user may select a half-flex button image (FB) to link the two burners and control the same simultaneously. Description in relation to this is provided hereunder with reference to FIG. 8.

When any one of the first and second working coils (WC1 and WC2) detects an object to be heated, an object-to-be-heated burner image (FI1) corresponding to a burner zone, where the object to be heated is detected, may only be activated (<B> in FIG. 5).

The second zone (DZ) image may indicate a dual burner zone and include two burner zones having the same center and different diameters. Each of the burner zones may correspond to the third and fourth working coils (WC3 and WC4) in FIG. 2.

For example, when the third and fourth working coils (WC3 and WC4) detect an object to be heated at the same time due to a relatively large diameter of the object to be heated, an object-to-be-heated burner image (FI22) including the two burner zones may be activated (<C> in FIG. 5). When the third working coil (WC3) only detects an object to be heated due to a relatively small diameter of the object to be heated, an object-to-be-heated burner image (FI21) including only a small-diameter burner zone may be activated (<B> in FIG. 5).

The third zone (SZ) image may indicate a single burner zone and include only a single circular burner zone. When the fifth working coil (WC5) detects an object to be heated, an object-to-be-heated burner image (FI3) may be activated (<B> and <C> in FIG. 5).

A power image (PI) for activating operation of a corresponding working coil (WC) may be displayed at the center of each of the object-to-be-heated burner images (e.g., FI11, FI12, FI21, FI22 and FI3).

Additionally, a setting image (SI) and an auxiliary image (CI) may be displayed at a lower end of the input interface 300.

When the input interface 300 is turned on, the first to third zone (HFZ, DZ and SZ) images may be displayed at an upper portion of the input interface 300, and the setting image (SI) and the auxiliary image (CI) may be displayed at a lower portion of the input interface 300.

Then, when an object to be heated is placed on the upper plate 115 and the second control module 320 detects a position of the object to be heated, an object-to-be-heated burner image (FI) and a power image (PI) may be additionally displayed on the input interface 300.

In this case, the first control module 310 may control the input interface 300 such that the input interface 300 displays the object-to-be-heated burner image (FI) based on information of a position of the object to be heated received from the second control module 320.

Referring to FIG. 6, first to third zone (e.g., HFZ1, DZ and HFZ2) images corresponding to positions of the plurality of working coils (WC), object-to-be-heated burner images (e.g., FI11, F12, F21, F22, F31 and F32), a setting image (SI) and an auxiliary image (CI) may be displayed on the interface 300 of another example half-flex type induction heating device 2.

The first and third zone (HFZ1 and HFZ2) images may be displayed substantially in the same way as the first zone (HFZ) image in FIG. 5. The remaining zone (i.e., the second zone (DZ)) image, the object-to-be-heated burner image (FI), the setting image (SI) and the auxiliary image (CI)) may be displayed according to the same method as the method described with reference to FIG. 5.

Additionally, the first control module 310 may control the input interface 300 such that the input interface 300 displays an object-to-be-heated burner image (FI) in different ways based on whether an automatic sensing mode is activated.

When the automatic sensing mode is activated, the first control module 310 may display the first to third zone (HFZ, DZ and SZ) images and may display no object-to-be-heated burner image (FI). Then, when the second control module 320 detects an object to be heated, the first control module may display only an object-to-be-heated burner image (FI) relevant to a corresponding zone (<A>→<B> in FIGS. 5 and 6).

On the contrary, when the automatic sensing mode is not activated, the first control module 310 may activate and display all the object-to-be-heated burner images (FI) on the first to third zone (HFZ, DZ and SZ) images (<A>→<C> in FIGS. 5 and 6). Then, when the second control module 320 detects an object to be heated, the first control module 310 may adjust a size of an object-to-be-heated burner image (FI) of a corresponding zone where the object to be heated is detected, and may display the object-to-be-heated burner image (FI) on the input interface 300 (That is, the first control module 310 may adjust a size of an object-to-be-heated burner image (FI) based on a detected object to be heated and may display the object-to-be-heated burner image (FI) even in a zone where the object to be heated is not detected.) (<C>→<B> in FIGS. 5 and 6).

The above description is provided only as an example, and a method of displaying an object-to-be-heated burner image (FI) may be modified and implemented in numerous different forms.

Figure 7:
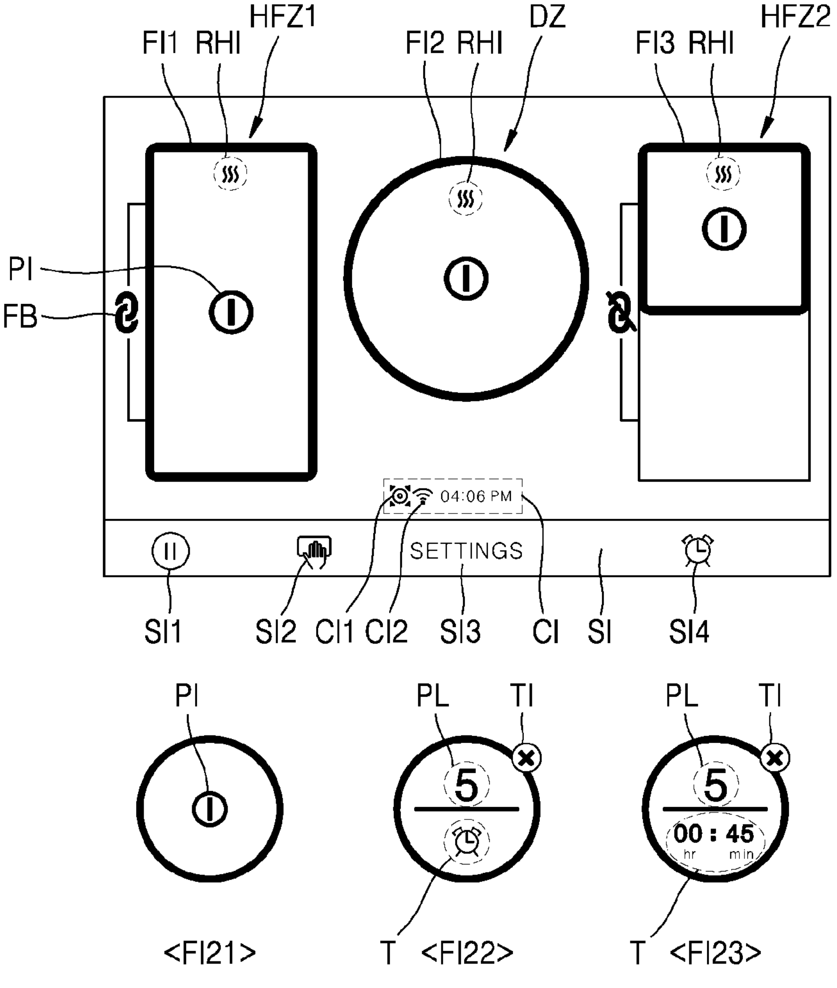
FIGS. 7 to 9 are schematic views for describing a method of displaying a burner image in a half-flex type induction heating device according to some embodiments.
Figure 8:
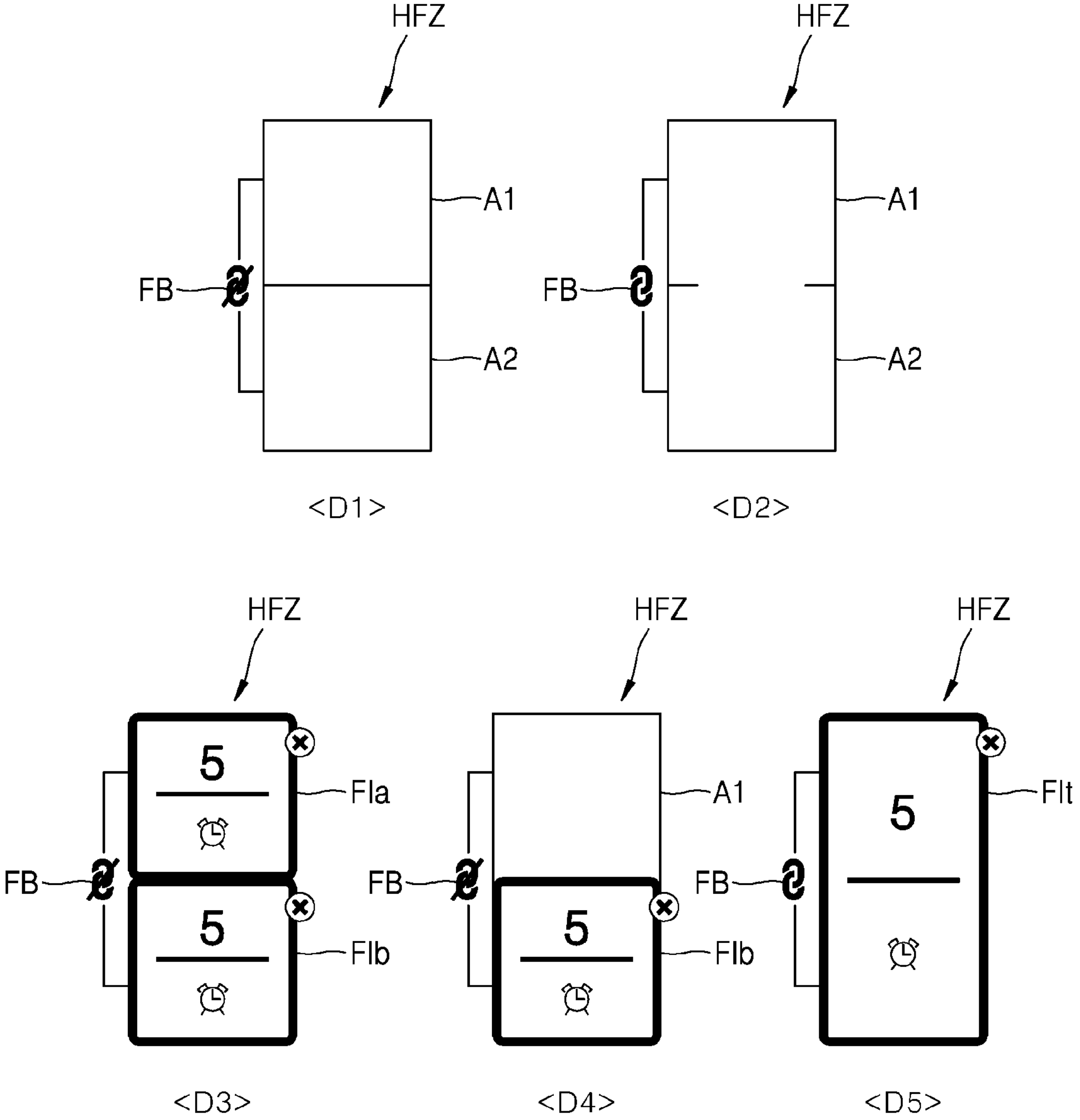
Figure 9:
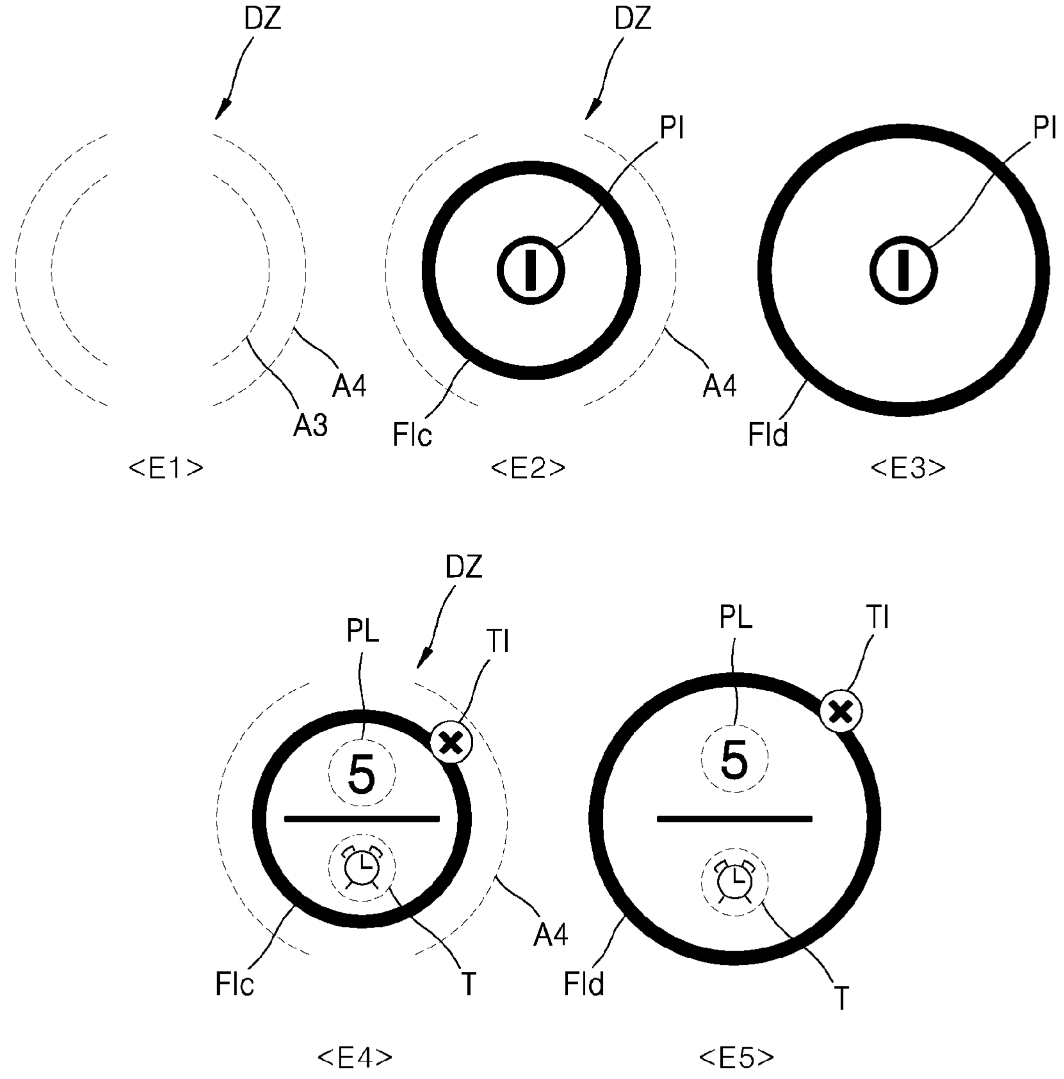

FIGS. 7 to 9 are schematic views for describing a method of displaying a burner image in a half-flex type induction heating device according to some embodiments.

Referring to FIG. 7, the input interface 300 may display first to third zone (HFZ1, DZ and HFZ2) images, object-to-be-heated burner images (FI1 to FI3) respectively corresponding to each of the zones, a setting image (SI) where a setting icon is displayed, and an auxiliary image (CI) where an auxiliary icon is displayed.

The first to third zone (HFZ1, DZ and HFZ2) images may be more blurred than the object-to-be-heated burner images (FI1 to FI3), and may be displayed at the same time as the half-flex type induction heating device is powered on.

The object-to-be-heated burner image (FI1 to FI3) may be displayed at a position corresponding to a position of a working coil (WC) to which an object to be heated is currently being provided.

Below, the object-to-be-heated burner image (FI2) having a circular edge displayed on the second zone image (DZ) is described as an example of an object-to-be-heated burner image (FI1 to FI3).

Images displayed inside the object-to-be-heated burner images (FI1 to FI3) have something in common.

A power image (PI) may be displayed at a center of a first object-to-be-heated burner image (FI21), and, when the user touches the power image (PI), a working coil (WC) relevant to a corresponding burner may start operating.

A second object-to-be-heated burner image (FI22) may be displayed when the user touches the power image (PI). In this case, the second object-to-be-heated burner image (FI22) may include a heating intensity image (PL), a timer image (T) and a termination image (TI).

The heating intensity image (PL) may indicate an output level of a working coil (WC), the timer image (T) may indicate an icon for setting an operation period of a working coil (WC), and the termination image (TI) may indicate an icon for immediately stopping operation of a working coil (WC).

Though described hereunder, even when a working coil (WC) stops operating, a temperature of a burner does not drop immediately. In this case, a residual heat image (RHI), indicating that the temperature of the burner is higher than a reference temperature, may be displayed in the second object-to-be-heated burner image (FI22).

The heating intensity image (PL) may be disposed at an upper side of the object-to-be-heated burner image (FI2), the time image (T) may be disposed at a lower side of the object-to-be-heated burner image (FI2), and the termination image (TI) may be disposed on a boundary line of the object-to-be-heated burner image (FI2).

The third object-to-be-heated burner image (FI23) may be displayed when the user selects the timer image (T) and sets an operation period of a working coil (WC). The operation period may denote remaining time in relation to operation of a working coil (WC).

Additionally, the setting image (SI) may include a temporarily lowering icon (SI1), a button locking icon (SI2), a setting list icon (SI3) and a timer icon (SI4).

The temporarily lowering icon (SI1) may be used to simultaneously temporarily lower a temperature of each burner or to simultaneously restore a temperature of each burner to a state prior to the state where the temperature of each burner is temporarily lowered. The button locking icon (SI2) may perform a clean lock operation to prevent another button from receiving an input for a certain period of time. The setting list icon (SI3) may shift a screen to a screen for setting an option for operation of the half-flex type induction heating device. The timer icon (SI4) may shift a screen to a screen for setting an operation period of a working coil (WC).

The auxiliary image (CI) may include an object-to-be-heated automatic sensing mode icon (CI1), a Wi-Fi connection state icon (CI2), and a current time displaying icon (CI3).

The object-to-be-heated automatic sensing mode icon (CI1) may be displayed when an automatic sensing mode is activated in the half-flex type induction heating device. The Wi-Fi connection state icon (CI2) may be displayed when the half-flex type induction heating device is able to connect to Wi-Fi. The current time displaying icon (CI3) may display current time on a screen.

FIG. 8 is a view for describing the function of a half-flex button image (FB). Below, a half-flex button image (FB) of the first zone (HFZ) image is described as an example.

Referring to FIG. 8, the first zone (HFZ) image may include a first sub zone (A1) corresponding to the first working coil (WC1) and a second sub zone (A2) corresponding to the second working coil (WC2). A half-flex button image (FB) may be displayed at one side of the first sub zone (A1) and the second sub zone (A2).

Image <D1> may be displayed when an object to be heated is not detected on the first and second working coils (WC1 and WC2) in a state in which the first sub zone (A1) and the second sub zone (A2) are unlinked. In this case, the half-flex button image (FB) may show that the first sub zone (A1) and the second sub zone (A2) are unlinked.

Image <D2> may be displayed when an object to be heated is not detected on the first and second working coils (WC1 and WC2) in a state in which the first sub zone (A1) and the second sub zone (A2) are linked. In this case, the half-flex button image (FB) may show that the first sub zone (A1) and the second sub zone (A2) are linked.

Image <D3> may be displayed when an object to be heated is detected on all the first and second working coils (WC1 and WC2) in the state in which the first sub zone (A1) and the second sub zone (A2) are unlinked. In this case, an object-to-be-heated burner image (FIa and FIb) may be respectively displayed on the first sub zone (A1) and the second sub zone (A2), and the first and second working coils (WC1 and WC2) may be respectively controlled.

Image <D4> may be displayed when an object to be heated is detected only on the second working coil (WC2) in the state in which the first sub zone (A1) and the second sub zone (A2) are unlinked. In this case, an object-to-be-heated burner image (FIb) may be displayed only on the second sub zone (A2).

Image <D5> may be displayed when an object to be heated is detected on the first and second working coils (WC1 and WC2) in the state in which the first sub zone (A1) and the second sub zone (A2) are linked. In this case, a single object-to-be-heated burner image (FIt) may be displayed on the first sub zone (A1) and the second sub zone (A2), and the first and second working coils (WC1 and WC2) may be controlled at the same time.

FIG. 9 is a view for describing an object-to-be-heated burner image (Fic and FId) displayed in a second zone (DZ) image.

Referring to FIG. 9, the second zone (DZ) image may include a third sub zone (A3) corresponding to the third working coil (WC3) and a fourth sub zone (A4) corresponding to the fourth working coil (WC4). The third sub zone (A3) and the fourth sub zone (A4) may be disposed to have the same center.

Image <E1> may be displayed when an object to be heated is not detected on the third and fourth working coils (WC3 and WC4). In this case, a blurred image indicating the third sub zone (A3) and the fourth sub zone (A4) may be displayed on the second zone (DZ) image.

Image <E2> may be displayed when an object to be heated is detected only on the third working coil (WC3). In this case, an object-to-be-heated burner image (FIc) may overlap on the third sub zone (A3). A power image (PI) may be displayed at a center of the object-to-be-heated burner image (FIc), and, when the power image (PI) is selected, the third working coil (WC3) may only operate.

Image <E3> may be displayed when an object to be heated is detected on all the third and fourth working coils (WC3 and WC4). In this case, an object-to-be-heated burner image (FId) may overlap and be displayed on the third and fourth sub zones (A3 and A4). A power image (PI) may be displayed at a center of the object-to-be-heated burner image (FId), and, when the power image (PI) is selected, the third and fourth working coils (WC3 and WC4) may operate at the same time.

Image <E4> may show a state where the third working coil (WC3) is operating as the user selects the power image (PI) of the object-to-be-heated burner image (FIc). In this case, a heating intensity image (PL) indicating a current output of a working coil and a timer image (T) for setting a timer may be displayed inside the object-to-be-heated burner image (FIc). Further, a termination image (TI) for enabling a one-step termination of operation of a working coil may be displayed at one side of the object-to-be-heated burner image (FIc).

Image <E5> may show a state where the third and fourth working coils (WC3 and WC4) are all operating as the user selects the power image (PI) of the object-to-be-heated burner image (FId). Likewise, a heating intensity image (PL) indicating a current output of a working coil and a timer image (T) for setting a timer may be displayed inside the object-to-be-heated burner image (FId), and a termination image (TI) for enabling a one-step termination of operation of a working coil may be displayed at one side of the object-to-be-heated burner image (FId).

Figure 10:
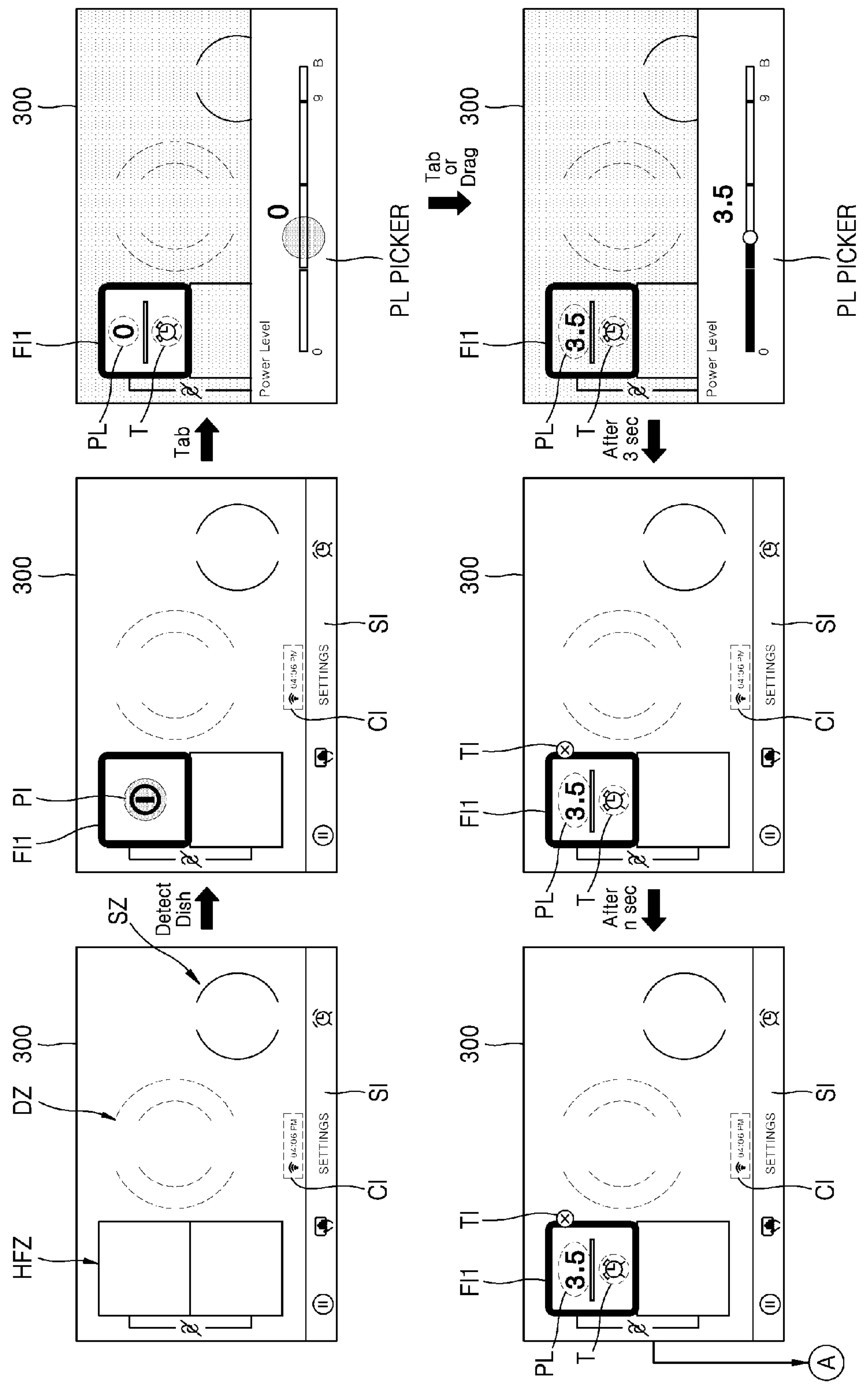
FIGS. 10 and 11 are schematic views for describing a method of a termination of a burner based on a touch input of a termination image.
Figure 11:
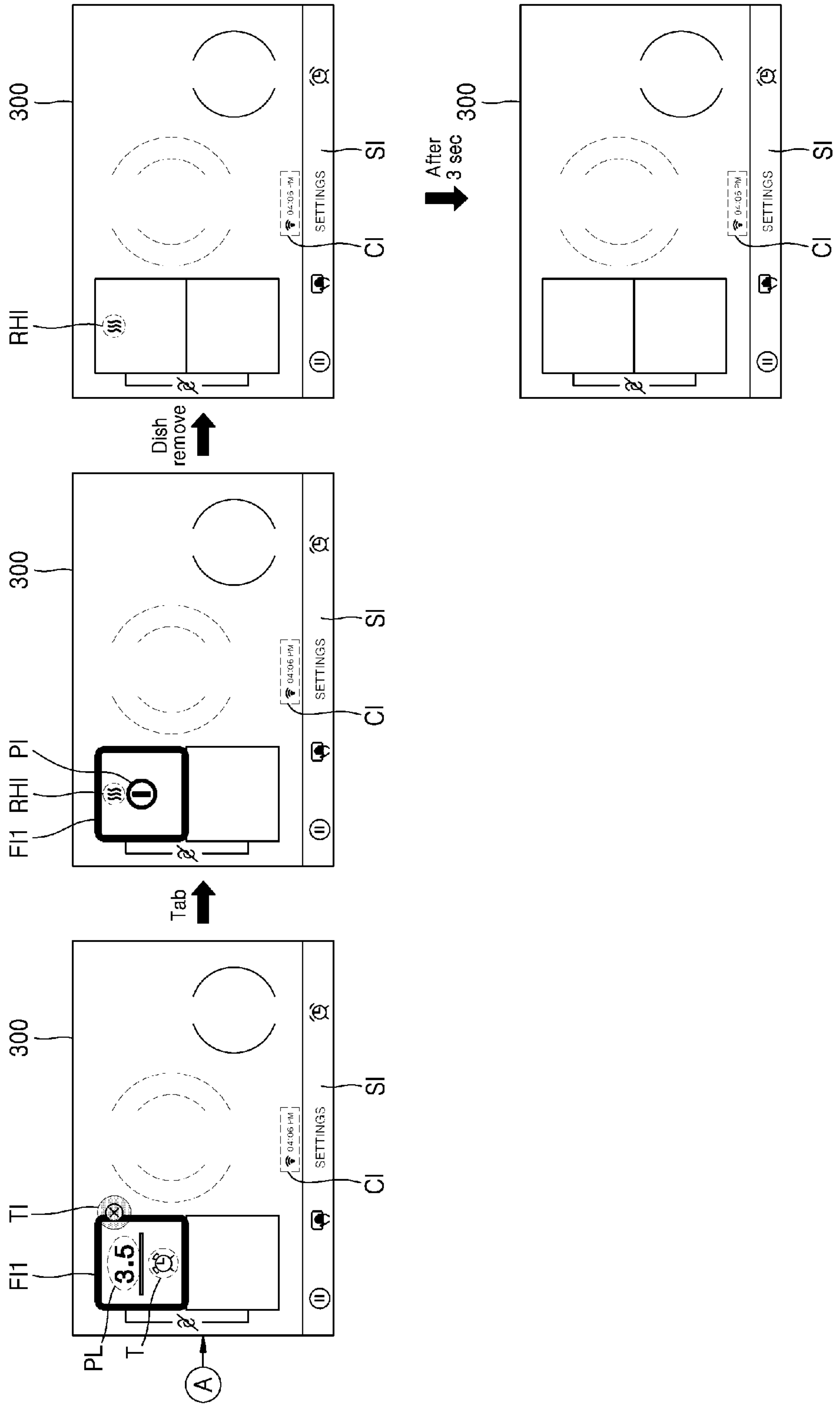
Figure 12:
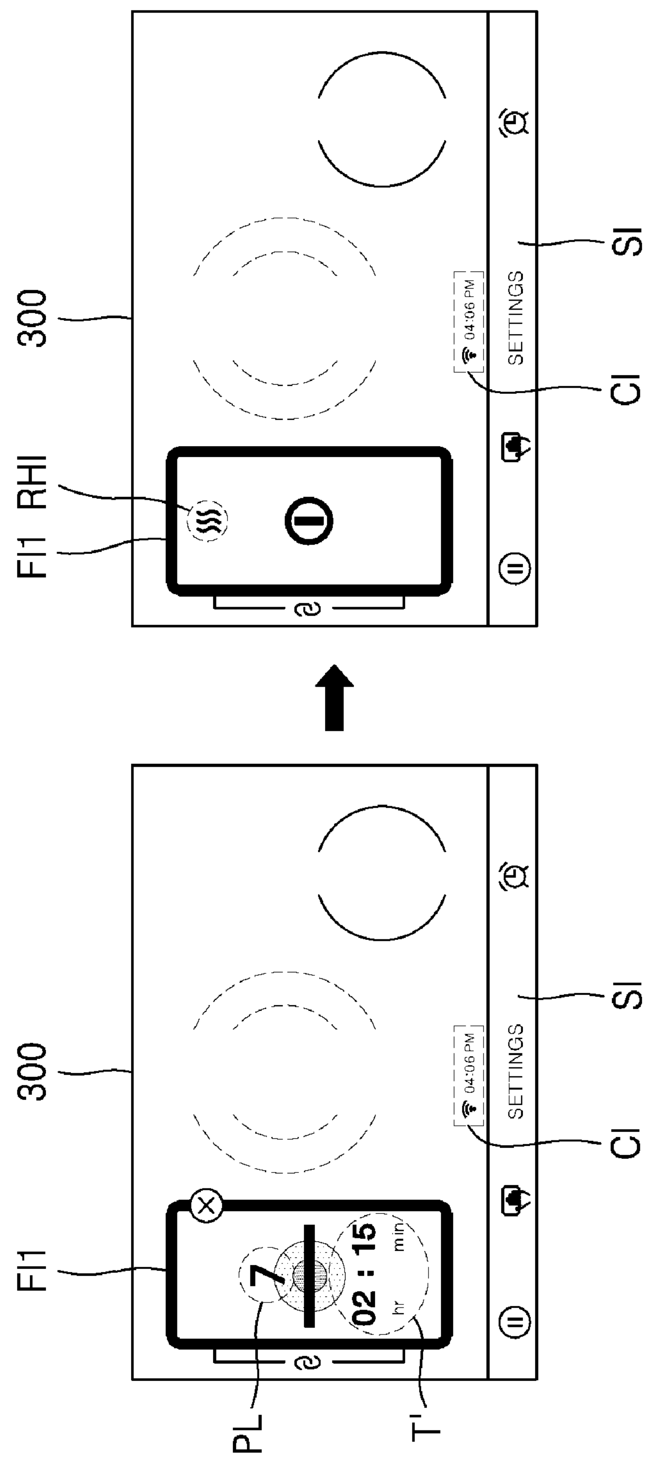
FIG. 12 is a schematic view for describing a method of a termination of a burner based on a touch input of an object-to-be-heated burner image.

FIGS. 10 and 11 are schematic views for describing a method of a termination of a burner based on a touch input of a termination image. FIG. 12 is a schematic view for describing a method of a termination of a burner based on a touch input of an object-to-be-heated burner image.

Referring to FIGS. 10 and 11, when the user operates the half-flex type induction heating device, first to third zone (HFZ, DZ and SZ) images, a setting image (SI) and an auxiliary image (CI) may be displayed on the input interface 300.

Then, when an object to be heated is detected on the first working coil (WC1), an object-to-be-heated burner image (FI1) may be displayed in a part of the first zone (HFZ) image.

Then as the user touches a power image (PI) in the object-to-be-heated burner image (FI1), a heating intensity image (PL) and a timer image (T) instead of the power image (PI) may be displayed on the input interface 300. Additionally, a heating intensity selecting image (PL PICKER) for selecting a heating intensity may also be displayed on the input interface 300.

In this case, the user may provide an input (e.g., an input of a heating intensity of 3.5 as a result of a touch or dragging) of a specific heating intensity as a result of a touch or dragging (Tap or Drag) to the input interface 300, and the specific heating intensity selected by the user may be displayed in the heating intensity image (PL).

Even when the user provides only an input of a specific heating intensity to the input interface 300 without an input in relation to a timer, a heating operation may start automatically after a predetermined period (e.g. three seconds). Then, since the timer is not set, a corresponding working coil may continue to perform the heating operation.

In this case, a termination image (TI) may be displayed at one side (e.g., on a boundary line) of the object-to-be-heated burner image (FI1).

In this situation, when the user touches the termination image (TI), the heating intensity image (PL) and the timer image (T) displayed on the input interface 300 may be changed into a power image (PI) and a residual heat image (RHI), and the working coil, which is heating a corresponding object to be heated, may stop operating.

When the heating intensity image (PL) and the timer image (T) displayed on the input interface 300 are changed into the power image (PI) and the residual heat image (RHI), the first control module 310 may control the input interface 300 such that the input interface 300 displays the residual heat image (RHI) until residual heat is removed from the cover plate 119, based on information on temperature of the cover plate 119.

When the object to be heated is removed from the working coil, the object-to-be-heated burner image (FI1) may disappear. However, the residual heat image (RHI) may be displayed on the input interface 300 until the temperature of the cover plate 119 is lower than a reference temperature.

In summary, when a touch input, provided from the user to the input interface 300, indicates a termination of a working coil being driven among the plurality of working coils (WC) (i.e., a touch input of a termination image (TI)), the second control module 320 may stop the driving of the working coil being driven (i.e., a working coil that is heating an object to be heated subject to a termination). Further, the first control module 310 may change the heating intensity image (PL) and the timer image (T), displayed on the input interface 300, into a power image (PI) and a residual heat image (RHI).

That is, when the user provides a touch input of the termination image (TI) to the input interface 300 in a state where a heating intensity image (PL) and a timer image (T) are displayed at the center of the object-to-be-heated burner image (FI1), the input interface 300 may provide the touch input of the termination image (TI) to the first control module 310, and the first control module 310 may provide the touch input of the termination image (TI) to the second control module 320.

Then the first control module 310 may change the heating intensity image (PL) and the timer image (T), displayed on the input interface 300, into a power image (PI) and a residual heat image (RHI), based on the touch input of the termination image (TI). Additionally, the second control module 320 may stop driving of a working coil being driven (i.e., a working coil that is heating an object to be heated subject to a termination), based on the touch input of the termination image (TI).

FIG. 12 is a view showing a method of a termination of a burner based on a long tap motion of an object-to-be-heated burner image.

As illustrated in FIG. 12, when an object to be heated is heated in a state where the object to be heated is placed on the cover plate 119, an object-to-be-heated burner image (FI1), a heating intensity image (PL), a modified timer image (T'), and a termination image (TI) may be displayed on the input interface 300. The modified timer image (T') may be displayed when the user selects a timer image (T) and sets an operation period. However, the modified timer image (T') is provided only as an example. When the timer is not set, the timer image (T) may be displayed.

In this situation, when the user touches the object-to-be-heated burner image (FI1) for a predetermined period or more (e.g., a three-second-or-more touch; i.e., a long tap), the heating intensity image (PL) and the modified timer image (T') displayed on the input interface 300 may be changed into a power image (PI) and a residual heat image (RHI), and a working coil heating the object to be heated may stop operating.

The user may touch any area of the object-to-be-heated burner image (FI1) for the predetermined period or more (e.g., three seconds or more).

When the heating intensity image (PL) and the timer image (T) displayed on the input interface 300 is changed into the power image (PI) and the residual heat image (RHI), the first control module 310 may control the input interface 300 such that the input interface 300 displays the residual heat image (RHI) until residual heat is removed from the cover plate 119, based on information on a temperature of the cover plate 119.

In summary, when a touch input, provided from the user to the input interface 300, indicates a termination of a working coil being driven among the plurality of working coils (WC) (i.e., a touch input of the object-to-be-heated burner image (FI1) for the predetermined period or more), the second control module 320 may stop driving of the working coil being driven (i.e., a working coil that is heating an object to be heated subject to a termination). Additionally, the first control module 310 may change the heating intensity image (PL) and the modified timer image (T') displayed on the input interface 300 into a power image (PI) and a residual heat image (RHI).

That is, when the user provides a touch input of the object-to-be-heated burner image (FI1) to the input interface 300 for a predetermined period or more in a state where the heating intensity image (PL) and the modified timer image (T') are displayed at a center of the object-to-be-heated burner image (FI1), the input interface 300 may provide the touch input of the object-to-be-heated burner image (FI1) for the predetermined period or more to the first control module 310, and the first control module 310 may provide the touch input of the object-to-be-heated burner image (FI1) for the predetermined period or more to the second control module 320.

Then, based on the touch input of the object-to-be-heated burner image (FI1) for the predetermined period or more, the first control module 310 may change the heating intensity image (PL) and the modified timer image (T') displayed on the input interface 300 into a power image (PI) and a residual heat image (RHI). Additionally, based on the touch input of the object-to-be-heated burner image (FI1) for the predetermined period or more, the second control module 320 may stop driving of a working coil being driven (i.e., a working coil that is heating an object to be heated subject to a termination).

That is, the two different touch input methods (i.e., a touch of a termination image (TI) and a long tap of an object-to-be-heated burner image (FI1)) enable a one-step termination of a burner (i.e., a working coil that is heating an object to be heated subject to a termination).

Figure 13:
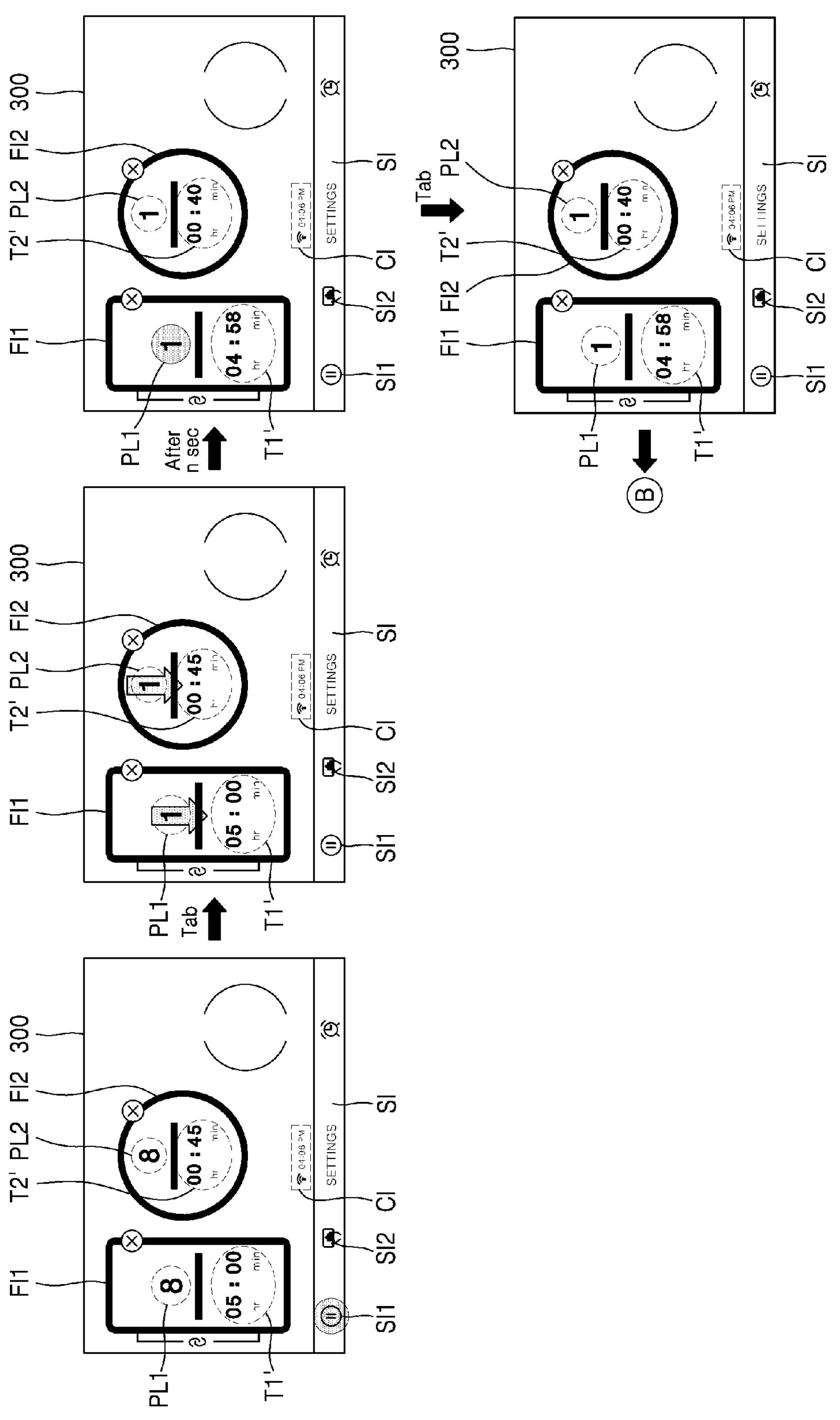
FIGS. 13 and 14 are schematic views for describing a method of changing and restoring a heating intensity based on a touch input of a temporarily lowering icon.
Figure 14:
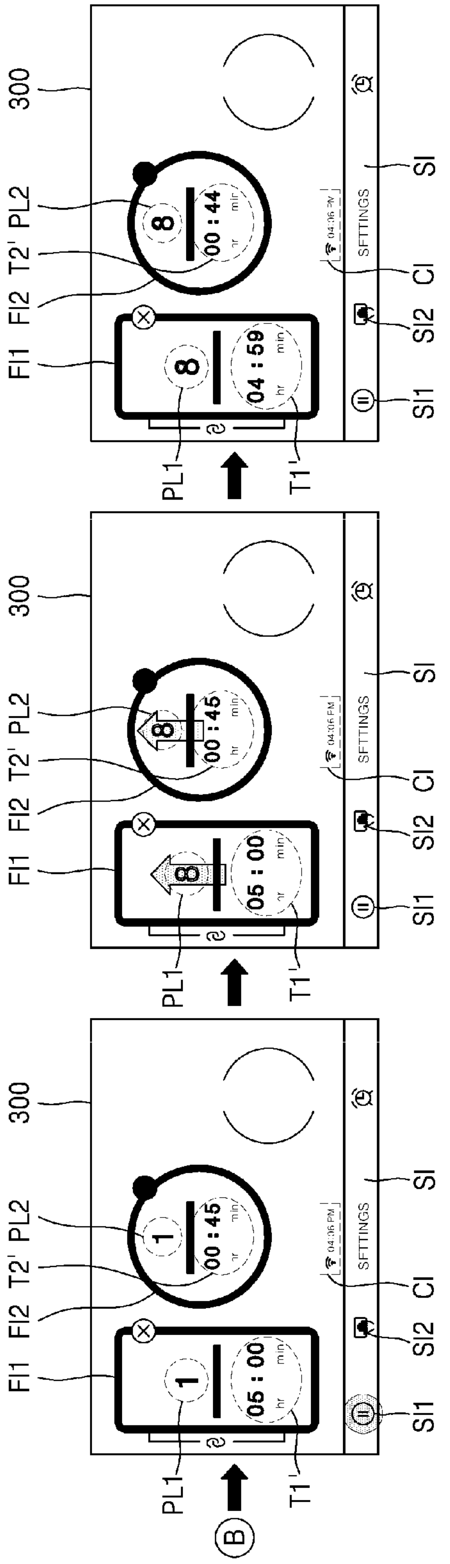

FIGS. 13 and 14 are schematic views for describing a method of changing and restoring a heating intensity based on a touch input of a temporarily lowering icon. FIGS. 13 and 14 show a method of changing and restoring a heating intensity based on a touch input of a temporarily lowering icon.

As illustrated in FIG. 13, when an object to be heated is heated in a state where the object to be heated is placed on the cover plate 119, first and second object-to-be-heated burner images (FI1 and FI2), each of the heating intensity images (PL1 and PL2), each of the modified timer images (T1' and T2'), and a termination image (TI) may be displayed on the input interface 300. Further, as described above, a setting image (SI) may be displayed at a lower end of the input interface 300, and the setting image (SI) may include a temporarily lowering icon (SI1).

In this situation, when the user touches the temporarily lowering icon (SI1), the heating intensity images (PL1 and PL2) may all be changed into a predetermined heating intensity (e.g., “1”).

Then the heating intensity images (PL1 and PL2) may be inactivated, and the temporarily lowering icon (SI1) may be blinking. Additionally, heating intensities of all the working coils being driven among the plurality of working coils (WC) may be changed into a predetermined heating intensity (e.g., "1"). That is, the heating intensities of all the working coils being driven may be forced to drop.

In the state where the heating intensity images (PL1 and PL2) become inactivated, the user may not change the heating intensity. However, regardless of this situation, a count in the modified timer images (T1' and T2') may be performed.

In summary, when the user provides a touch input of the temporarily lowering icon (SI1), displayed at the lower end of the input interface 300, to the input interface 300, the second control module 320 may change the heating intensities of all the working coils being driven among the plurality of working coils (WC) into the predetermined heating intensity (e.g., "1").

In this case, the first control module 310 may allow the temporarily lowering icon (SI1) displayed on the input interface 300 to blink, and may control the input interface 300 such that the input interface 300 displays the heating intensity image (PL1 and PL2), indicating the predetermined heating intensity (e.g., "1"), in the state of being inactivated.

That is, when the user provides a touch input of the temporarily lowering icon (SI1) to the input interface 300, the input interface 300 may provide the touch input of the temporarily lowering icon (SI1) to the first control module 310, and the first control module 310 may provide the touch input of the temporarily lowering icon (SI1) to the second control module 320.

Then, based on the touch input of the temporarily lowering icon (SI1), the first control module 310 may allow the temporarily lowering icon (SI1) displayed on the input interface 300 to blink, and may control the input interface 300 such that the input interface 300 displays the heating intensity image (PL1 and PL2), indicating the predetermined heating intensity (e.g., "1"), in the state of being inactivated. Additionally, based on the touch input of the temporarily lowering icon (SI1), the second control module 320 may change the heating intensities of all the working coils being driven among the plurality of working coils (WC) into the predetermined heating intensity (e.g., 1).

Then when the user retouches the temporarily lowering icon (SI1), the heating intensity images (PL1 and PL2), indicating a previous heating intensity (e.g., "8"; i.e., a heating intensity prior to the predetermined heating intensity changed (e.g., "1"), may be activated on the input interface 300, and the temporarily lowering icon (SI1) may stop blinking. Additionally, the heating intensities of all the working coils being driven among the plurality of working coils (WC) may restore to the previous heating intensity (e.g., "8"; i.e., a heating intensity prior to the predetermined heating intensity changed (e.g., "1").

In the state where the heating intensity images (PL1 and PL2) become activated, the user may change the heating intensity. Regardless of this situation, a count in the modified timer images (T1' and T2') may be performed.

In summary, when the user reprovides the touch input of the temporarily lowering icon (SI1), displayed at the lower end of the input interface 300, to the input interface 300, the second control module 320 may restore the heating intensities of all the working coils being driven among the plurality of working coils (WC) to the previous heating intensity (e.g., "8"; i.e., a heating intensity prior to the predetermined heating intensity changed (e.g., "1"). Additionally, the first control module 310 may allow the temporarily lowering icon (SI1) displayed on the input interface 300 to stop blinking, and may control the input interface 300 such that the input interface 300 displays the heating intensity images (PL1 and PL2), indicating the previous heating intensity (e.g., "8"; i.e., a heating intensity prior to the predetermined heating intensity changed (e.g., "1"), in a state of being activated.

That is, when the user provides the touch input of the temporarily lowering icon (SI1) again to the input interface 300, the input interface 300 may provide the touch input of the temporarily lowering icon (SI1) again to the first control module 310, and the first control module 310 may provide the touch input of the temporarily lowering icon (SI1) again to the second control module 320.

Based on the touch input of the temporarily lowering icon (SI1), the first control module 310 may allow the temporarily lowering icon (SI1), displayed on the input interface 300, to stop blinking, and may control the input interface 300 such that the input interface 300 displays the heating intensity images (PL1 and PL2), indicating the previous heating intensity (e.g., "8"; i.e., a heating intensity prior to the predetermined heating intensity changed (e.g., "1"), in the state of being activated. Additionally, based on the touch input of the temporarily lowering icon (SI1), the second control module 320 may restore the heating intensities of all the working coils being driven among the plurality of working coils (WC) to the previous heating intensity (e.g., "8"; i.e., a heating intensity prior to the predetermined heating intensity changed (e.g., "1").

That is, the user may temporarily lower or restore the heating intensities of a plurality of burners (i.e., a plurality of working coils performing heating) being driven at the same time, based on the touch input of the temporarily lowering icon (SI1).

Figure 15:
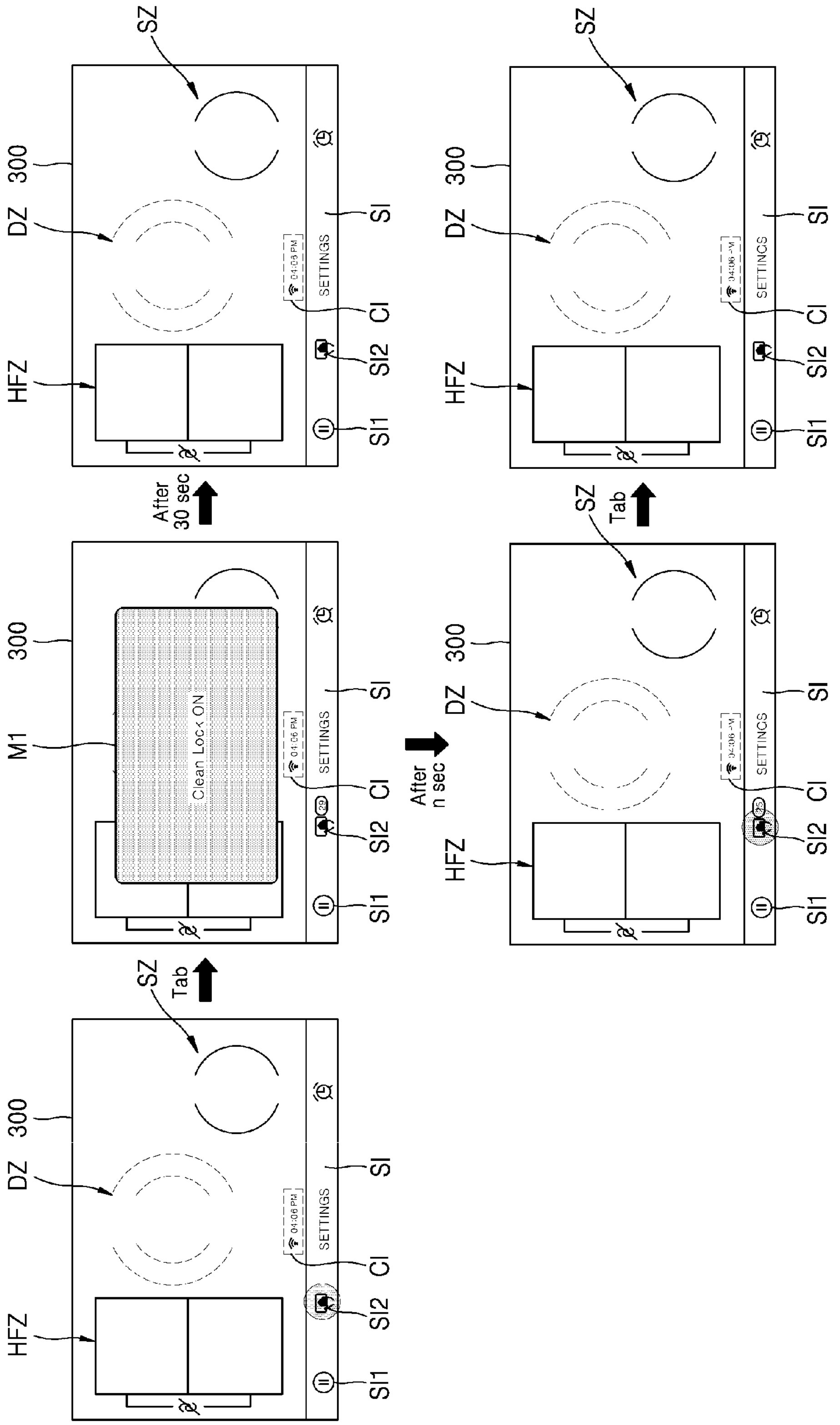
FIG. 15 is a schematic view for describing a button lock.

FIG. 15 is a schematic view for describing a button lock. FIG. 15 shows a clean lock based on a touch input of a button locking icon.

As illustrated in FIG. 15, when the user touches a button locking icon (SI2) on the setting image (SI), a message window (M1) indicating that a clean lock is activated may be displayed on the input interface 300.

In this case, even when an input of any button except the button locking icon (SI2) is provided onto the input interface 300, the first control module 310 may ignore the input and may not operate.

The clean lock may be done for a predetermined period (e.g., 30 seconds) and may be automatically undone after the predetermined period (e.g., 30 seconds). In this case, an elapsed period (i.e., a remaining period) of the predetermined period (e.g., 30 seconds) may be displayed at one side of the button locking icon (SI2).

The message window (M1) displayed on the input interface 300 may be maintained for a period shorter than the predetermined period (e.g., 30 seconds). For example, the message window (M1) may disappear from the input interface 300 after about one to two seconds, and, although the message window (M1) disappears, the clean lock may be maintained for the predetermined period (e.g., 30 seconds).

In this situation, when the user retouches the button locking icon (SI2) before the predetermined period (e.g., 30 seconds) passes, the clean lock may be immediately undone. When the clean lock is undone, the user may normally touch another button to deliver an operation instruction to the first control module 310.

In summary, when the user provides a touch input of the button locking icon (SI2), displayed at the lower end of the input interface 300, to the input interface 300, the first control module 310 may not execute operation in relation to other inputs (except a re-input of the button locking icon (SI2)) input for the predetermined period (e.g., 30 seconds)).

Additionally, the first control module 310 may display an elapsed period (i.e., a remaining period) of the predetermined period (e.g., 30 seconds) at one side of the button locking icon (SI2) displayed on the input interface 300. Further, the first control module 310 may allow the button locking icon (SI2), displayed on the input interface 300, to blink.

Then when the user retouches the button locking icon (SI2) before the predetermined period (e.g., 30 seconds) passes, the first control module 310 may turn off the clean lock, and when an input of another button is provided, may execute a corresponding function. In this case, the first control module 310 may allow the button locking icon (SI2) to stop blinking.

That is, when the user provides the touch input of the button locking icon (SI2) displayed at the lower end of the input interface 300 again to the input interface 300, the first control module 310 may allow the button locking icon (SI2), displayed on the input interface 300, to stop blinking, and may receive an input of other buttons on the input interface 300.

In other words, when the user provides the touch input of the button locking icon (SI2) again to the input interface 300, the input interface 300 may provide the touch input of the button locking icon (SI2) again to the first control module 310, and the first control module 310 may undo the clean lock.

Thus, when cleaning foreign substances on the input interface 300, the user may touch the button locking icon (SI2) to prevent any input of other buttons and to prevent execution of functions that are not desired by the user.

Figure 16:
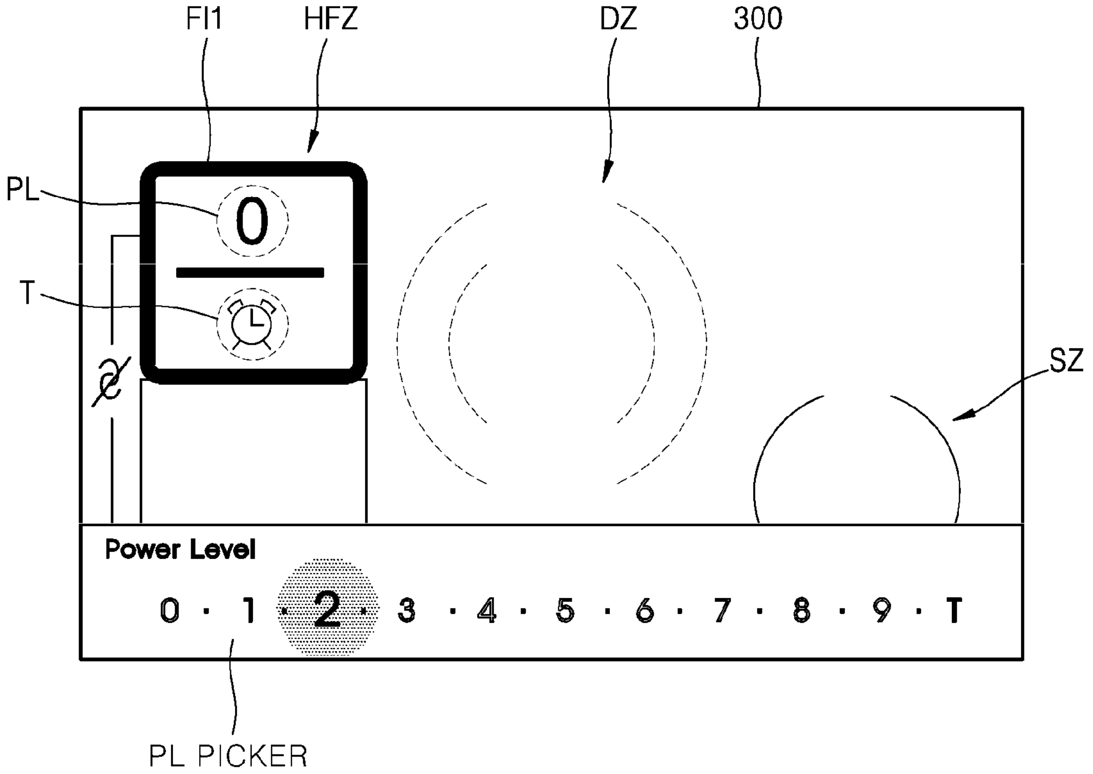
FIGS. 16 to 18 are schematic views for describing a method of setting a heating intensity and a timer in a half-flex type induction heating device according to some embodiments.
Figure 17:
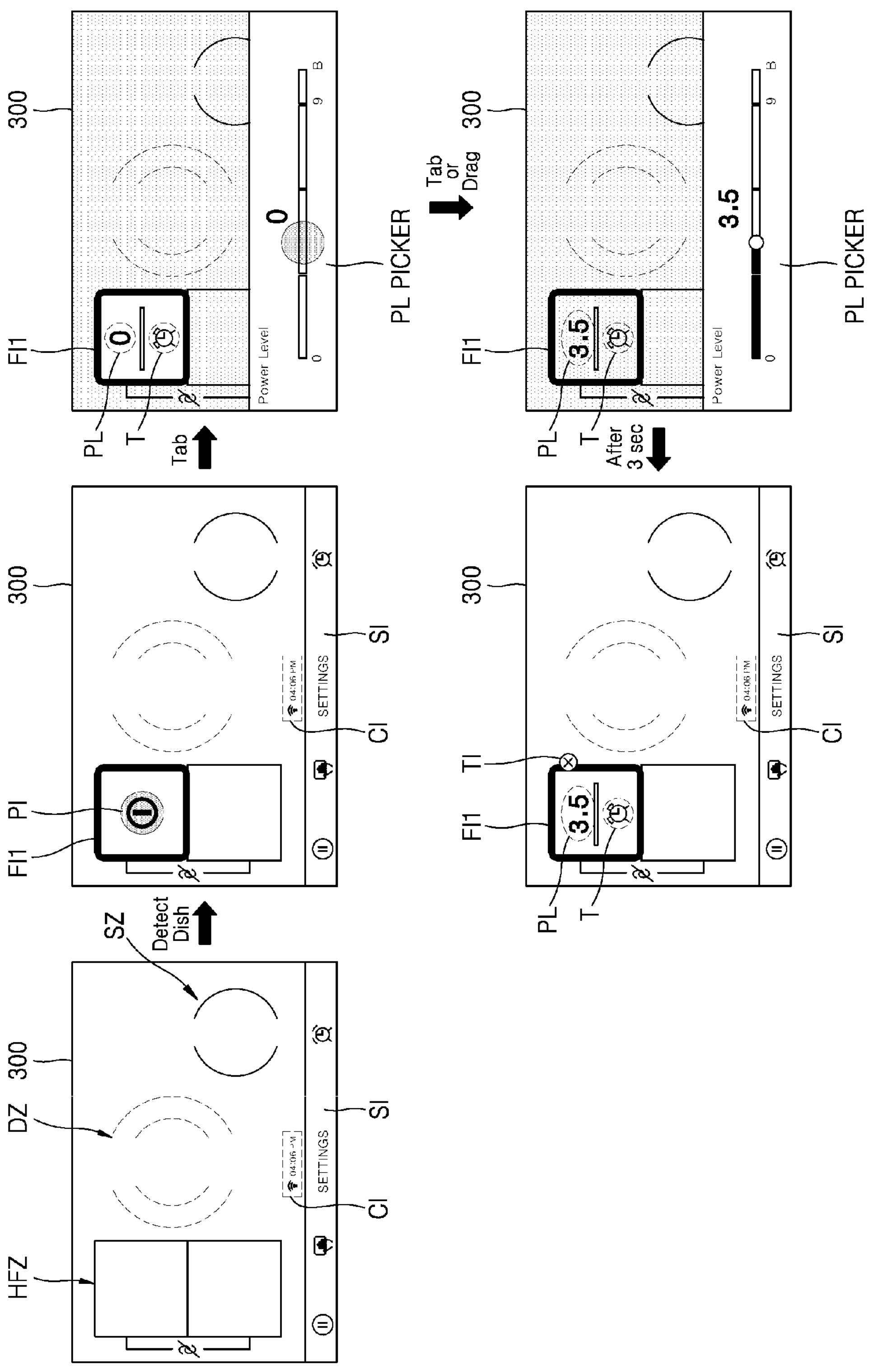
Figure 18:
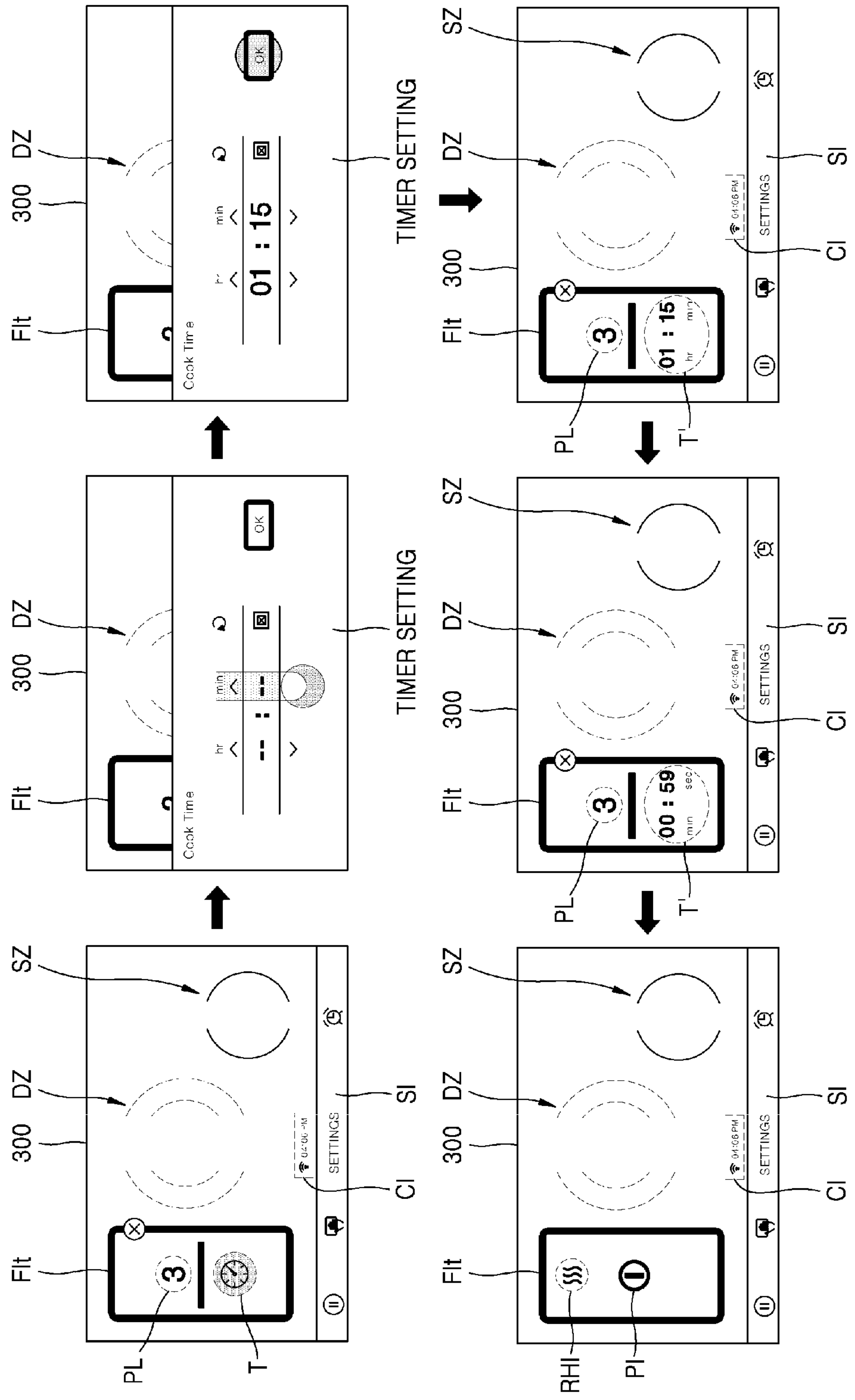
Figure 19:
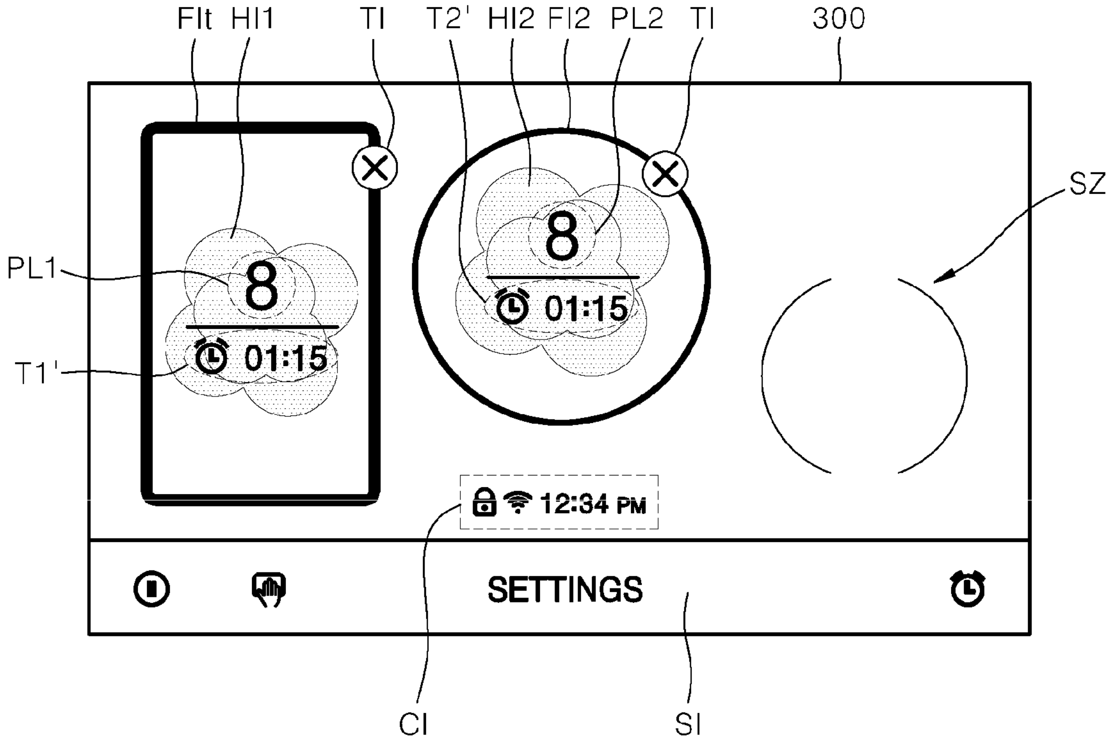
FIG. 19 is a schematic view for describing a heating image.
Figure 20:
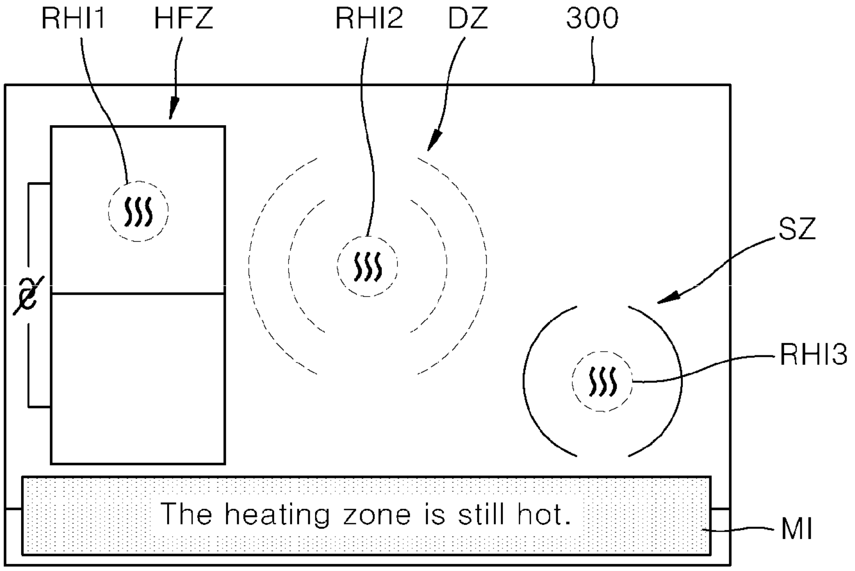
FIG. 20 is a schematic view for describing a residual heat image.
Figure 21:
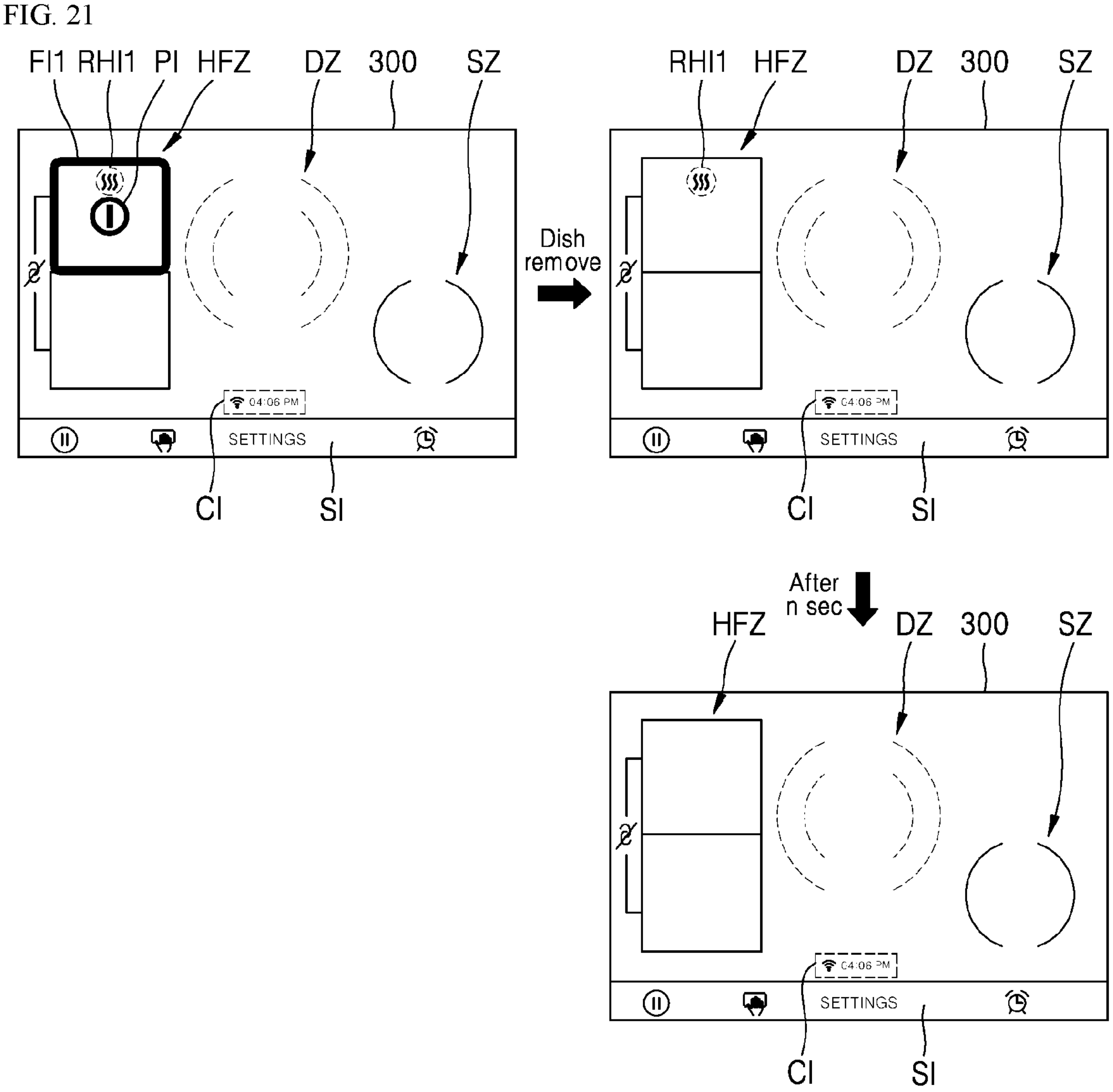
FIG. 21 is a schematic view for describing a method of displaying a residual heat image as a result of removal of an object to be heated.

FIGS. 16 to 18 are schematic views for describing a method of setting a heating intensity and a timer in a half-flex type induction heating device according to some embodiments. FIG. 19 is a schematic view for describing a heating image. FIG. 20 is a schematic view for describing a residual heat image. FIG. 21 is a schematic view for describing a method of displaying a residual heat image as a result of removal of an object to be heated.

FIG. 16 shows an actual appearance of an input interface on which a heating intensity image, a timer image and a heating intensity selecting image are displayed, FIG. 17 shows a schematic appearance of an input interface when a heating intensity is displayed after being selected, and FIG. 18 shows a schematic appearance of an input interface when a timer is displayed after being set.

Referring to FIGS. 16 and 17, when receiving a touch input of the power image (PI) from the user, the input interface 300 may provide the touch input of the power image (PI) to the first control module 310. Based on the touch input of the power image (PI) received from the input interface 300, the first control module 310 may control the input interface 300 such that the input interface 300 displays at least one of a heating intensity image (PL) and a timer image (T).

That is, when the user touches the power image (PI), the input interface 300 may display the heating intensity image (PL) and the timer image (T) instead of the power image (PI). Additionally, the input interface 300 may also display the heating intensity selecting image (PL PICKER) such that a heating intensity is selected.

In this case, the user may provide an input (e.g., a touch input of the heating intensity of 3.5) in relation to a specific heating intensity to the input interface 300 as a result of dragging, and the specific heating intensity selected by the user may be displayed in the heating intensity image (PL).

Even when the user provides only an input in relation to the specific heating intensity to the input interface 300 without an input in relation to the timer, heating may start automatically after a predetermined period (e.g., three seconds) passes.

When the user touches the timer image (T) in a state where the heating intensity image (PL) and the timer image (T) are displayed on the input interface 300, as illustrated in FIG. 18, the input interface 300 may display a timer selecting (timer setting) image such that the timer is selected.

In this case, the user may provide a touch input in relation to values of specific time and a specific minute as a result of dragging, and then may touch an "OK" icon to set the timer.

The timer selected by the user may be displayed as the modified timer image (T') and then may be counted. After a predetermined period passes, the power image (PI) may be redisplayed at the center of an object-to-be-heated burner image (FI).

When heat remains on the upper plate 115, the residual heat image (RHI) may also be displayed inside the object-to-be-heated burner image (FI).

When receiving an input in relation to a specific heating intensity from the user, the input interface 300 may provide the input in relation to a specific heating intensity to the first control module 310. The first control module 310 may provide the input in relation to a specific heating intensity to the second control module 320, and, as illustrated in FIG. 19, may control the input interface 300 such that the input interface 300 displays heating images (HI1 and HI2) based on the input in relation to a specific heating intensity. Additionally, based on the input in relation to a specific heating intensity, the second control module 320 may drive a working coil disposed at a position where an object to be heated is detected among the plurality of working coils (e.g., WC).

Referring to FIG. 19, the heating image (HI1 and HI2) as a background image in addition to the heating intensity image (PL) and the modified timer image (T') may be displayed at a center of an object-to-be-heated burner image (Fit and FI2).

The heating image (HI1 and HI2) may be displayed in a specific area of the input interface 300 on which the object-to-be-heated burner images (Fit and FI2) are displayed, and may be repeatedly displayed in the form of a dynamic image. Accordingly, the heating images (HI1 and HI2) may be repeatedly reproduced on the input interface 300 in a motion having the color and shape of a flame while working coils are being driven (i.e., while heating is performed).

Thus, the user may easily visually notice that an object to be heated is currently being heated.

The heating image (HI1 and HI2) in FIG. 19 may be expressed as an animation having different colors and shapes, and may be modified and implemented in numerous different forms.

FIGS. 20 and 21 show a method of displaying a residual heat image in the half-flex type induction heating device.

FIG. 20 shows an actual state of an input interface on which a residual heat image is displayed, and FIG. 21 is a view for describing a method of displaying a residual heat image as a result of removal of an object to be heated.

The input interface 300, as described above, may receive a touch input from the user and provide the received touch input to the first control module 310. In this case, the first control module 310 may receive information on a temperature of the cover plate 119 from the temperature sensor 330

(That is, the first control module 310 may receive information on a temperature of the upper plate 115).

The first control module 310 may control whether to display a residual heat image of the input interface 300, based on the information on the temperature of the cover plate 119 received from the temperature sensor 330. That is, when considering that residual heat remains on the cover plate 119, the first control module 310 may control the input interface 300 such that the input interface 300 displays a residual heat image (RHI).

When residual heat remains on the cover plate 119 as illustrated in FIG. 20, the residual heat images (RHI1, RHI2 and RHI3) may be displayed inside at least one of the first to third zone (HFZ1, DZ and HFZ2) images of the input interface 300.

Additionally, when residual heat remains on the cover plate 119, a message window (M1), indicating the cover plate 119 is still hot, may be displayed on the input interface 300.

The message window (M1) may disappear after a certain period of time (e.g., three seconds) passes or may continue to be displayed until residual heat is removed from the cover plate 119.

Though not specifically illustrated in the drawing, the residual heat images (RHI1, RHI2 and RHI3) may be displayed at any one of an an upper end at one side of the upper surface of the input interface 300 or an upper end at the other side of the upper surface of the input interface 300.

Below, a residual heat image (RHI1), displayed inside at least one of the first to third zone (HFZ1, DZ and HFZ2) images of the input interface 300, is provided as an example for convenience of description.

The residual heat image (RHI1) may be displayed on the input interface 300 in the following situation.

Described is an example in which the user provides a touch input, indicating a termination of a working coil being driven among the plurality of working coils (e.g., WC), to the input interface 300.

The input interface 300 may provide the input to the first control module 310, and the first control module 310 may control the input interface 300 such that the input interface 300 displays the residual heat image (RHI1) until residual heat is removed from the cover plate 119, based on the input and information on a temperature of the cover plate 119.

When residual heat remains on the cover plate 119, the first control module 310 may keep the input interface 300 on until the residual heat is removed from the cover plate 119 based on information on a temperature of the cover plate 119, and, when residual heat is removed from the cover plate 119, the first control module 310 may turn off the input interface 300 based on information on a temperature of the cove plate 119.

When an object to be heated is removed from a working coil disposed at a position where the object to be heated is detected, among the plurality of working coils (e.g., WC), and the working coil stops operating, as illustrated in FIG. 21, the first control module 310 may control the input interface 300 such that the input interface 300 displays a residual heat image (RHI1) until residual heat is removed from the cover plate 119, based on information on a temperature of the cover plate 119.

That is, when the object to be heated is removed from the working coil, an object-to-be-heated burner image (FI1) may disappear but the residual heat image (RHI1) may be displayed on the input interface 300 until the temperature of the cover plate 119 is less than a reference temperature.

In this case, the first control module 310 may control the input interface 300 such that the input interface 300 displays the residual heat image (RHI1) until the residual heat is removed from the cover plate 119, based on information on the temperature of the cover plate 119.

Then when the temperature of the cover plate 119 is less than the reference temperature (e.g., after n seconds pass), the residual heat image (RHI1) may disappear from the input interface 300.

Additionally, though not specifically illustrated in the drawing, when the user touches a termination image (TI in FIG. 19), a heating intensity image (PL) and a timer image (T) displayed on the input interface 300 may be changed into a power image (PI) and a residual heat image (RHI), and a working coil heating an object to be heated corresponding to the working coil may stop operating.

Then when the heating intensity image (PL) and the timer image (T) on the input interface 300 are changed into the power image (PI) and the residual heat image (RHI), the first control module 310 may control the input interface 300 such that the input interface 300 displays the residual heat image (RHI) until residual heat is removed from the cover plate 119, based on information on a temperature of the cover plate 119.

In summary, when the touch input, provided from the user to the input interface 300, indicates a termination of a working coil being drive among the plurality of working coils (WC) (i.e., a touch input of a termination image (TI)), the second control module 320 may allow the working coil being driven (i.e., a working coil that is heating an object to be heated subject to a termination) to stop operating. In this case, the first control module 310 may change a heating intensity image (PL) and a timer image (T) on the input interface 300 into a power image (PI) and a residual heat image (RHI1).

Then when the object to be heated is removed from the working coil, the first control module 310 may control the input interface 300 such that the input interface 300 displays the residual heat image (RHI1) and does not display an object-to-be-heated burner image (FI1) until residual heat is removed from the cover plate 119, based on information on a temperature of the cover plate 119.

Then when the residual heat is removed from the cover plate 119 after a certain period of time passes (i.e., when the temperature of the cover plate 119 is less than a reference temperature), the first control module 310 may remove the residual heat image (RHI1) from the input interface 300.

Then, though not specifically illustrated in the drawing, when the residual heat image (RHI1) disappears and a certain period of time passes, the first control module 310 may turn off the input interface 300.

That is, when residual heat remains on the cover plate 119 in different situations in the half-flex type induction heating device according to the present disclosure, the input interface 399 may display the residual heat image (RHI1), thereby making it possible to prevent burns that might be caused by the residual heat.

Figure 22:
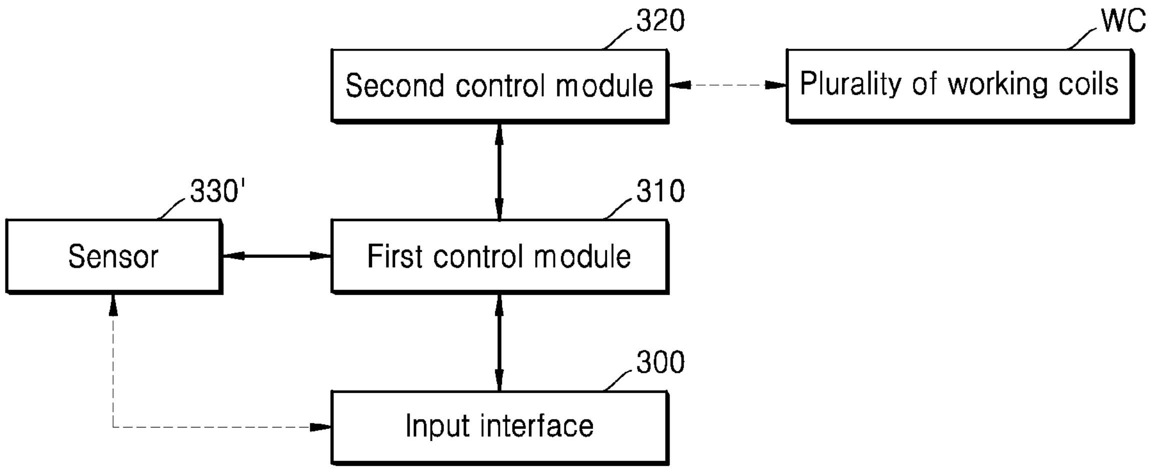
FIG. 22 is a schematic view for describing another example of a control flow of the half-flex type induction heating device in FIG. 1.

FIG. 22 is a schematic view for describing another example of a control flow of the half-flex type induction heating device in FIG. 1.

As illustrated in FIG. 22, the half-flex type induction heating device according to some embodiments may include a sensor 330' configured to sense at least one of temperature and vibration of the input interface 300 instead of a temperature sensor (330 in FIG. 4) configured to sense a temperature of the cover plate 119.

The sensor 330' may sense at least one of temperature and vibration of the input interface 300 and provide information on at least one of the sensed temperature and vibration of the input interface 300 to the first control module 310.

The sensor 330' may include a temperature sensor configured to sense a temperature of the input interface 300 and a vibration sensor configured to sense vibration (i.e., an impact) of the input interface 300. However, in some embodiments, a single sensor, in which the temperature sensor and the vibration sensor are integrated, is described for convenience of description.

The first control module 310 may receive information on at least one of temperature and vibration of the input interface 300 from the sensor 330' and control whether to display a protection guide image of the input interface 300 based on the received information on at least one of temperature and vibration of the input interface 300.

Figure 23:
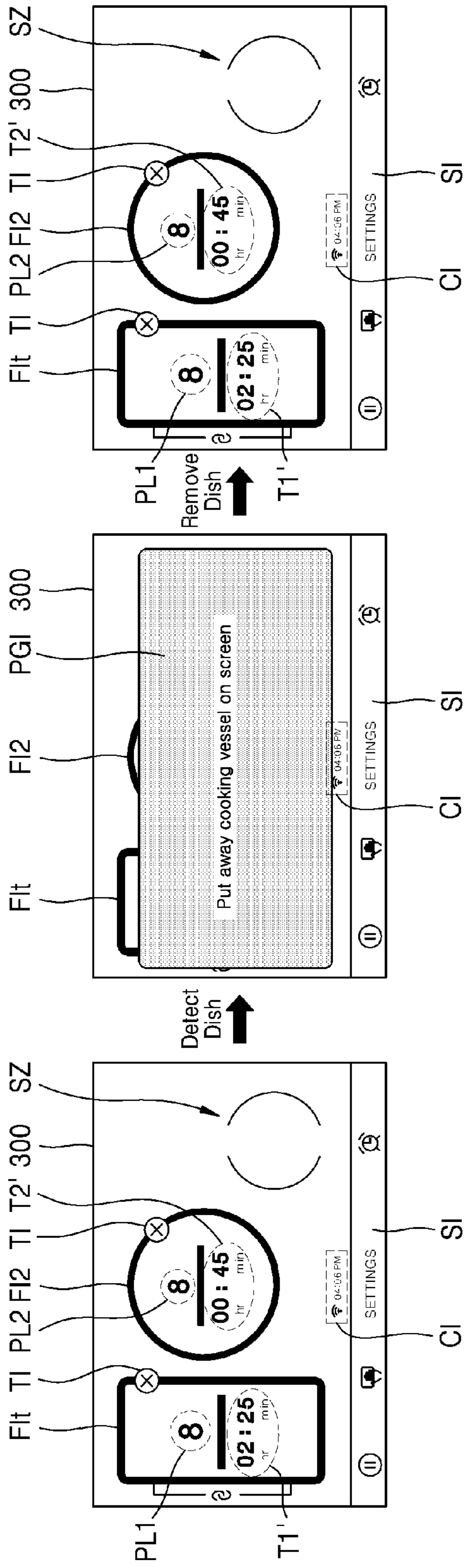
FIG. 23 is a schematic view for describing a method of displaying a protection guide image.

FIG. 23 shows a method of displaying a protection guide image in the half-flex type induction heating device.

FIG. 23 shows a schematic state of the input interface when a protection guide image is displayed, and is described with reference to the half-flex type induction heating device in FIG. 22.

The input interface 300, as described above, may receive a touch input from the user and provide the received touch input to the first control module 310. The first control module 310 may receive information on at least one of temperature and vibration of the input interface 300 from the sensor 330'.

Additionally, the first control module 310 may control whether to display a protection guide image of the input interface 300, based on the information on at least one of temperature and vibration of the input interface 300 received from the sensor 330'.

That is, the first control module 310 may analyze the information on at least one of temperature and vibration of the input interface 300 received from the sensor 330', compare a result of the analysis with a predetermined reference level, and, based on the result of the comparison, control whether to display a protection guide image of the input interface 300.

When the result of the analysis is higher than the predetermined reference level, the first control module 310 may control the input interface 300 such that the input interface 300 displays a protection guide image (PGI).

When the result of the first control module 310's analysis of the information on at least one of temperature and vibration of the input interface 300 newly received from the sensor 330', is the same or lower than the predetermined reference level in a state where the input interface 300 displays the protection guide image (PGI), the first control module 310 may control the input interface 300 such that the protection guide image displayed on the input interface 300 disappears.

The result of the analysis may be a value of a result of a comprehensive analysis of numerical values of each of the temperature and vibration of the input interface 300, and the predetermined reference level may be a single value.

In case the result of the analysis is divided into a result of analysis of temperature of the input interface 300 and a result of analysis of vibration of the input interface 300, the predetermined reference level may also be divided into a reference level of temperature and a reference level of vibration. Additionally, a result of comparison between the result of the analysis of each of the temperature and vibration of the input interface 300 and the reference level of each of the temperature and vibration of the input interface 300 may be applied to determining whether to display the protection guide image (PGI).

In some embodiments, the result of the analysis as a value of a result of a comprehensive analysis of numerical values of each of the temperature and vibration of the input interface 300 is described as an example for convenience of description.

Based on the above method, when the result of the analysis of temperature and vibration of the input interface 300 is higher than the predetermined reference level, as illustrated in FIG. 23, the protection guide image (PGI) may be displayed on the input interface 300 to overlap with an existing object-to-be-heated burner image (Fit and FI2).

When the result of the analysis of temperature and vibration of the input interface 300 is the same as or lower than the predetermined reference level again, the protection guide image (PGI) displayed on the input interface 300 may disappear.

The protection guide image (PGI), for example, may be displayed as a warning sign such as "Put away the cooking vessel on the screen", but not limited.

Though not illustrated in the drawing, the half-flex type induction heating device 1, 2 may be provided with a speaker (not illustrated; i.e., a sound module). In this case, the first control module 310 may control whether to output a protection guide voice of the speaker based on the result of the comparison.

When the result of the analysis is higher than the predetermined reference level, the first control module 310 may control the speaker such that the speaker repeatedly outputs a protection guide voice (e.g., "Put away the cooking vessel on the screen.") at predetermined frequency or for a predetermined period.

The first control module 310 may also control the input interface 300 and the speaker at the same time such that the speaker outputs the protection guide voice while the input interface 300 displays the protection guide image (PGI).

In some embodiments, an example in which the input interface 300 displays the protection guide image (PGI) is described for convenience of description.

In summary, when heat or vibration (i.e., an impact) is applied to the input interface 300 at a predetermined reference level or above, the protection guide image (PGI) may be displayed on the input interface 300 in the form of a pop-up to inform the user about the heat and vibration. Accordingly, damage to the input interface 300 caused by the heat and impact may be prevented.

As described above, the half-flex type induction heating device according to some embodiments may enable a one-step termination of a burner. Accordingly, in an emergency (e.g., a situation where water in a pot boils over), a user may immediately deal with the situation. Thus, the risk of a fire or a burn may be minimized.

The half-flex type induction heating device according to some embodiments may simultaneously temporarily lower or restore heating intensities of a plurality of burners being driven. Accordingly, improvement in user convenience may be ensured. Additionally, in an emergency (e.g., a situation where water in a pot boils over), the user may deal with the situation efficiently.

The half-flex type induction heating device according to some embodiments may ensure improvement in user experience and user interface. Accordingly, user convenience in different situations may be improved.

The half-flex type induction heating device according to some embodiments may sense and display residual heat. Accordingly, the user may be prevented from burns caused due to the residual heat and may avoid worries about the residual heat. Thus, efficiency of cooking may be ensured.

The half-flex type induction heating device according to some embodiments may visually display a heating image. Accordingly, the user may easily visually notice that an object to be heated is being heated and have no need to repeatedly check whether the object to be heated is rightly being heated. Thus, ease of use may be improved.

The half-flex type induction heating device according to some embodiments may protect the input interface. Accordingly, the risk of damage, caused by heat or vibration (i.e., an impact), to the input interface may be reduced. Thus, the lifespan of the input interface may be improved.

The embodiments have been described with reference to a number of illustrative embodiments thereof. However the present disclosure is not intended to limit the embodiments and the accompanying drawings, and the embodiments can be replaced, modified and changed by those skilled in the art that will fall within the spirit and scope of the principles of this disclosure.

The invention claimed is:

1. A half-flex type induction heating device, comprising:

a plurality of working coils installed in a case and disposed respectively in a plurality of zones spaced apart from each other;

a cover plate coupled to an upper end of the case and at which an object to be heated by at least one of the plurality of working coils is placed at an upper surface;

an input interface configured to receive a touch input from a user and to display a specific image, and embedded in the upper surface of the cover plate;

a first controller configured to control the specific image displayed on the input interface based on the touch input received from the input interface;

a second controller configured to control driving of the plurality of working coils based on the touch input received from the input interface, wherein, based on the input interface receiving a touch input for a termination image of a working coil being driven among the plurality of working coils, the second controller stops the driving of the working coil being driven, and the first controller changes a heating intensity image and a timer image displayed on the input interface into a power image and a residual heat image, wherein the first controller controls the input interface to display an object-to-be-heated burner image based on information regarding a position of an object to be heated, wherein, based on a touch input of the power image being received at the input interface in a state in which the power image is displayed at a center of the object-to-be-heated burner image:

the input interface provides the touch input of the power image to the first controller, and the first controller controls the input interface to display a heating intensity image and a timer image based on the touch input of the power image.

2. The half-flex type induction heating device of claim 1, wherein the plurality of working coils comprises:

a first and a second working coil disposed in a first zone in an up-down direction, a third and a fourth working coil having a same center in a second zone different from the first zone, and a fifth working coil disposed in a third zone different from the first and second zones.

3. The half-flex type induction heating device of claim 1, wherein the second controller detects a working coil on which the object to be heated is placed at an upper portion thereof among the plurality of working coils, and provides the information regarding the position of the detected object to be heated to the first controller.

4. The half-flex type induction heating device of claim 3, wherein the object-to-be-heated burner image is displayed in first to third display zones of the input interface to correspond to the position of the object to be heated on the cover plate, and the termination image is displayed at an edge of one side of the object-to-be-heated burner image.

5. The half-flex type induction heating device of claim 4, wherein, based on a touch input of the termination image being received at the input interface in a state in which the heating intensity image and the timer image are displayed at a center of the object-to-be-heated burner image:

the input interface provides the touch input of the termination image to the first controller, and the first controller changes the heating intensity image and the timer image displayed on the input interface into the power image and the residual heat image, based on the touch input of the termination image.

6. The half-flex type induction heating device of claim 4, wherein, based on a touch input of the object-to-be-heated burner image being received at the input interface for a predetermined period or more in a state in which the heating intensity image and the timer image are displayed at a center of the object-to-be-heated burner image:

the input interface provides the touch input of the object-to-be-heated burner image for a predetermined period or more to the first controller, and the first controller changes the heating intensity image and the timer image displayed on the input interface into the power image and the residual heat image, based on the touch input of the object-to-be-heated burner image for a predetermined period or more.

7. The half-flex type induction heating device of claim 1, further comprising;

a temperature sensor configured to sense a temperature of the cover plate and to provide information regarding the sensed temperature of the cover plate to the first controller, and wherein the first controller determines whether to display a residual heat image based on the provided information on the temperature of the cover plate.

8. The half-flex type induction heating device of claim 7, wherein, based on the heating intensity image and the timer image displayed on the input interface being changed into the power image and the residual heat image, the first controller controls the input interface to display the residual heat image until residual heat is removed from the cover plate based on the information regarding the temperature of the cover plate.

9. A half-flex type induction heating device, comprising:

a plurality of working coils installed in a case and disposed respectively in a plurality of zones spaced apart from each other;

a cover plate coupled to an upper end of the case and at which an object to be heated by at least one of the plurality of working coils is placed at an upper surface;

an input interface configured to receive a touch input from a user and to display a specific image, and embedded in the upper surface of the cover plate;

a first controller configured to control the specific image displayed on the input interface based on the touch input received from the input interface; and a second controller configured to control driving of the plurality of working coils based on the touch input received from the input interface, wherein, based on a touch input of a temporarily lowering icon displayed at a lower end of the input interface being provided from the user to the input interface, the second controller changes heating intensities of the plurality of working coils being driven among the plurality of working coils into a predetermined heating intensity, wherein, based on a touch input of the temporarily lowering icon being received at the input interface:

the input interface provides the touch input of the temporarily lowering icon to the first controller, and the first controller allows the temporarily lowering icon, displayed on the input interface, to blink based on the touch input of the temporarily lowering icon, and controls the input interface to display a heating intensity image, which indicates the predetermined heating intensity, in a state of being inactivated.

10. The half-flex type induction heating device of claim 9, wherein, based on the input interface being turned on, a setting image including the temporarily lowering icon is displayed at a lower end of the input interface.

11. The half-flex type induction heating device of claim 9, wherein, based on the touch input of the temporarily lowering icon being received again at the input interface:

the input interface provides the touch input of the temporarily lowering icon again to the first controller, and the first controller allows the temporarily lowering icon, displayed on the input interface, to stop blinking based on the re-provided touch input of the temporarily lowering icon, and controls the input interface to display a heating intensity image, which indicates a heating intensity prior to the predetermined heating intensity changed, in a state of being activated.

12. The half-flex type induction heating device of claim 9, wherein, based on the touch input of the temporarily lowering icon being received again at the input interface:

the input interface provides the touch input of the temporarily lowering icon again to the first controller, the first controller provides the touch input of the temporarily lowering icon again to the second controller, and the second controller restores heating intensities of the plurality of working coils being driven, among the plurality of working coils, based on the re-provided touch input of the temporarily lowering icon, to a heating intensity prior to the predetermined heating intensity changed.

* * * * *